US011892582B2

(12) United States Patent
Gillott

(10) Patent No.: US 11,892,582 B2
(45) Date of Patent: Feb. 6, 2024

(54) REAL TIME IDENTIFICATION OF EXTRANEOUS NOISE IN SEISMIC SURVEYS

(71) Applicant: Magseis FF LLC, Houston, TX (US)

(72) Inventor: Graham Gillott, Houston, TX (US)

(73) Assignee: Magseis FF LLC, Houston, TX (US)

(*) Notice: Subject to any disclaimer, the term of this patent is extended or adjusted under 35 U.S.C. 154(b) by 523 days.

(21) Appl. No.: 17/005,784

(22) Filed: Aug. 28, 2020

(65) Prior Publication Data

US 2022/0066060 A1    Mar. 3, 2022

(51) Int. Cl.
| | |
|---|---|
| *G01V 1/34* | (2006.01) |
| *G01V 1/18* | (2006.01) |
| *G01V 1/30* | (2006.01) |
| *G01V 1/37* | (2006.01) |
| *G01V 1/36* | (2006.01) |

(52) U.S. Cl.
CPC .............. *G01V 1/345* (2013.01); *G01V 1/181* (2013.01); *G01V 1/186* (2013.01); *G01V 1/301* (2013.01); *G01V 1/375* (2013.01); *G01V 1/364* (2013.01)

(58) Field of Classification Search
CPC ........ G01V 1/345; G01V 1/181; G01V 1/301; G01V 1/375; G01V 1/364
See application file for complete search history.

(56) References Cited

U.S. PATENT DOCUMENTS

| 8,380,435 B2* | 2/2013 | Kumaran | G01V 1/301 |
| | | | 700/89 |
| 2004/0064259 A1 | 4/2004 | Haaland et al. | |
| 2010/0114495 A1* | 5/2010 | Al-Saleh | G01V 1/364 |
| | | | 367/43 |

(Continued)

FOREIGN PATENT DOCUMENTS

| WO | WO 1998/052072 | * | 3/1999 |
| WO | WO 2008/042774 | * | 4/2008 |

OTHER PUBLICATIONS

International Search Report and Written Opinion dated Sep. 29, 2021 for International Patent Application No. PCT/US2020/038451, 12 pages.

(Continued)

*Primary Examiner* — Mohamed Charioui
*Assistant Examiner* — Lynda Dinh
(74) *Attorney, Agent, or Firm* — Sage Patent Group

(57) ABSTRACT

A system to detect and control noise in seismic surveys is provided. The system receives, responsive to a seismic wave generated by a source, seismic data detected by a sensor component of a seismic data acquisition unit. The system generates, for windows of the seismic data, Hough tensors for seismic data transforms in multiple dimensions. The system detects, based on a comparison of an eigenvector and eigenvalue of a canonical matrix of the Hough tensors with a historical eigenvector and eigenvalue of a historical canonical matrix of historical Hough tensors of historical seismic data, a first presence of noise in the seismic data. The (Continued)

first presence of noise can correspond to a noisy spectra pattern in a seismic data transform of the seismic data. The system provides, responsive to detection of the first presence of noise in the seismic data, a notification to adjust a characteristic of the seismic survey.

17 Claims, 10 Drawing Sheets

(56) References Cited

U.S. PATENT DOCUMENTS

| | | |
|---|---|---|
| 2015/0236668 A1 | 8/2015 | Poole et al. |
| 2015/0254812 A1* | 9/2015 | Srdic ................. G06V 10/30 382/264 |
| 2015/0331123 A1 | 11/2015 | Guigne et al. |
| 2020/0167914 A1* | 5/2020 | Stamatoyannopoulos ................. G06T 7/0012 |

OTHER PUBLICATIONS

Alregib, G., et al.; "Subsurface Structure Analysis Using Computational Interpretation and Learning: A Visual Signal Processing Perspective"; IEEE Signal Processing Magazine, vol. 35, No. 2, Mar. 12, 2018, 22 pages.

* cited by examiner

Hough Accumulator Space For Seismic
Data Having Extraneous Noise
700

Hough Accumulator Space for Reference Coil Component
708

Hough Accumulator Space for Hydrophone Component
710

Hough Accumulator Space Vertical Particle Motion Component
712

REAL TIME IDENTIFICATION OF EXTRANEOUS NOISE IN SEISMIC SURVEYS

BACKGROUND

Seismic surveys can be performed to identify subsurface lithological formations or hydrocarbons. The seismic surveys can be performed on land or in an aqueous medium, such as in the ocean or sea.

SUMMARY

Systems and methods of the present technical solution can identify extraneous noise in seismic survey operations in real-time. Extraneous noise can refer to or include any noise that is detrimental to processing or using seismic data collected during the seismic survey operation. Extraneous noise can refer to any noise generated by foreign sources separate from or outside the control of the seismic survey operation. Foreign sources can include, for example, other vessels and mechanical systems, noise due to changes in air pressure, noise due to mechanical issues, noise due to vibrations, noise due to a side swipe, noise due to faults or calibration issues of a sensor in a seismic data acquisition unit. Identifying the noise in real-time can refer to determining the noise during the seismic survey, within a shot interval, or within a predetermined amount of time of a shot interval, such as within 10 seconds, 20 seconds, 30 seconds or other time of the shot interval. Systems and methods of this technical solution, upon identifying the extraneous noise in real-time during or within a predetermine time of the shot interval, can generate and provide a notification of the detected extraneous noise. The system can provide the notification for display to facilitate mitigating or eliminating the source of the extraneous noise, thereby improving the quality of seismic data collected in subsequent shot intervals during the seismic survey.

At least one aspect is directed to a system to detect and control noise in seismic surveys. The system can include a data processing system having memory and one or more processors. The data processing system can receive, responsive to a seismic wave generated by a source, seismic data detected by a sensor component of a seismic data acquisition unit. The data processing system can generate the 1-dimensional and the 2-dimensional Fourier transform over various time and space windows to which the system can then apply the Hough transform to produce tensors in Hough space which may or may not be further filtered or processed. The data processing system can detect, based on a comparison of one or more regions of the Hough tensor characterized by various matrix forms and their corresponding eigenvalue and eigenvectors, with historical data, a first presence of extraneous coherent and incoherent noise in the seismic data. The first presence of noise can correspond to a change in the pattern of the aliased noise in at least one of the plurality of 2-dimensional Fourier transforms of the plurality of windows of the seismic data. This may or may not also be accompanied by a change in the pattern of the frequency spectra in the 1-dimensional Fourier transform. The data processing system can provide, response to detection of the first presence of noise in the seismic data, a notification to adjust a characteristic of the seismic survey to cause subsequently detected seismic data to have a second presence of noise that is less than the first presence of noise.

At least one aspect is directed to a method of detecting and controlling noise in seismic surveys. The method can be performed by a data processing system having memory and one or more processors. The method can include the data processing system receiving, responsive to a seismic wave generated by a source, seismic data detected by a sensor component of a seismic data acquisition unit. The method can include the data processing system generating multiple 1 and 2-dimensional Fourier transforms of multiple windows of the seismic data and their Hough transforms. The method can include the data processing system detecting, based on a comparison of one or more regions of the Hough tensor characterized by various matrix forms and their corresponding eigenvalue and eigenvectors, with historical data, a first presence of extraneous coherent and incoherent noise in the seismic data. The first presence of noise can correspond to a change in the pattern of the aliased noise in at least one of the plurality of 2-dimensional Fourier transforms of the plurality of windows of the seismic data. This can but does not have to be accompanied by a change in the pattern of the frequency spectra in the 1-dimensional Fourier transform. The method can include the data processing system providing, responsive to detection of the first presence of noise in the seismic data, a notification to adjust a characteristic of the seismic survey to cause subsequently detected seismic data to have a second presence of noise that is less than the first presence of noise.

At least one aspect is directed to a system to detect and control noise in seismic surveys. The system can include a data processing system having memory and one or more processors. The data processing system can receive, responsive to a seismic wave generated by a source, seismic data detected by a sensor component of a seismic data acquisition unit. The data processing system can generate, for multiple windows of the seismic data, Hough tensors for seismic data transforms in multiple dimensions. The data processing system can detect, based on a comparison of an eigenvector and eigenvalue of a canonical matrix of the Hough tensors with a historical eigenvector and eigenvalue of a historical canonical matrix of historical Hough tensors of historical seismic data, a first presence of noise in the seismic data. The presence of noise can correspond to a noisy spectra pattern in a seismic data transform. The data processing system can provide, responsive to detection of the first presence of noise in the seismic data, a notification to adjust a characteristic of the seismic survey to cause subsequently detected seismic data to have a second presence of noise that is less than the first presence of noise.

At least one aspect is directed to a method of detecting and controlling noise in seismic surveys. The method can be performed by a data processing system having memory and one or more processors. The method can include the data processing system receiving, responsive to a seismic wave generated by a source, seismic data detected by a sensor component of a seismic data acquisition unit. The method can include the data processing system generating, for multiple windows of the seismic data, Hough tensors for seismic data transforms in multiple dimensions. The method can include the data processing system detecting, based on a comparison of an eigenvector and eigenvalue of a canonical matrix of the Hough tensors with a historical eigenvector and eigenvalue of a historical canonical matrix of historical Hough tensors of historical seismic data, a first presence of noise in the seismic data. The presence of noise can correspond to a noisy spectra pattern in a seismic data transform. The method can include the data processing system providing, responsive to detection of the first presence of noise in the seismic data, a notification to adjust a characteristic of the seismic survey to cause subsequently detected seismic data to have a second presence of noise that is less than the first presence of noise.

At least one aspect is directed to a method. The method can include providing a data processing system. The data processing system can receive, responsive to a seismic wave generated by a source, seismic data detected by a sensor component of a seismic data acquisition unit. The data processing system can generate, for multiple windows of the seismic data, Hough tensors for seismic data transforms in multiple dimensions. The data processing system can detect, based on a comparison of an eigenvector and eigenvalue of a canonical matrix of the Hough tensors with a historical eigenvector and eigenvalue of a historical canonical matrix of historical Hough tensors of historical seismic data, a first presence of noise in the seismic data. The presence of noise can correspond to a noisy spectra pattern in a seismic data transform. The data processing system can provide, responsive to detection of the first presence of noise in the seismic data, a notification to adjust a characteristic of the seismic survey to cause subsequently detected seismic data to have a second presence of noise that is less than the first presence of noise.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
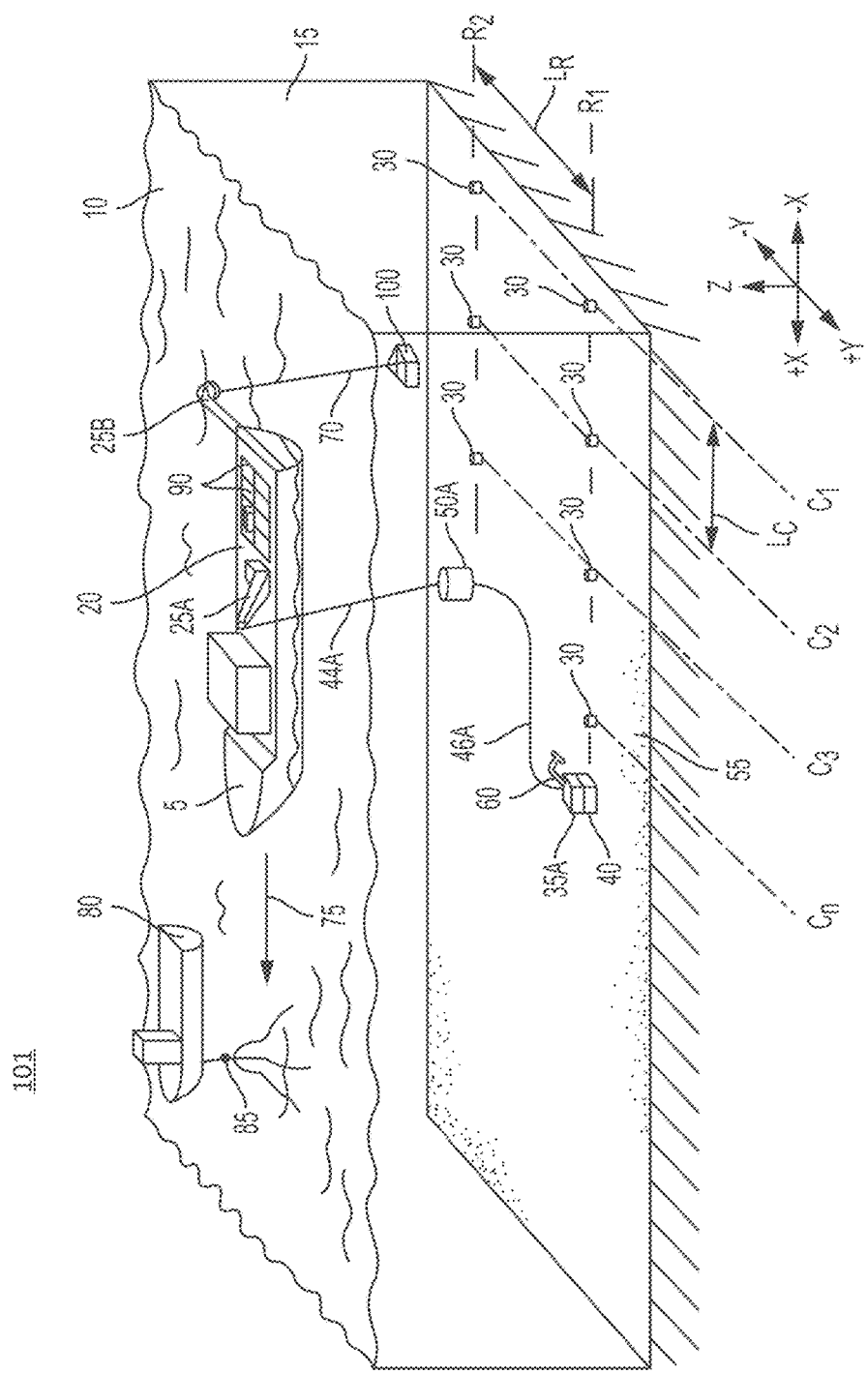
FIG. 1 depicts an isometric schematic view of an example of a seismic operation in deep water, in accordance with an implementation.

The present technical solution is directed to real-time identification of extraneous noise in seismic surveys. Seismic surveys can be performed using numerous seismic data acquisition units or sensors, over large areas of land or water, and over long durations. Seismic surveys can collect large amount of data, which can be processed to generate images, graphs, diagrams or other indications of subsurface lithological formations or hydrocarbons or other minerals. Due to the large amounts of data, it can be technically challenging and resource intensive to process the data to generate such images or diagrams. Further, due to the resource intensive nature of processing the seismic data, the presence of any extraneous noise may not be detected until completion of the seismic survey because the seismic data may be processed in an offline manner or by another system subsequent to completion of the seismic survey. For example, it can be challenging to detect extraneous noise that is different from expected coherent noise based on amplitude alone.

Systems and methods of the present technical solution allow for real-time identification of extraneous noise in seismic data during a seismic survey or shortly after the shot interval in which the seismic data was collected (e.g., within 10 seconds, 20 seconds, 30 seconds, 60 seconds, 2 minutes or other time interval that facilitates mitigating the source of the extraneous noise or otherwise mitigating the negative consequence of the extraneous noise on downstream processing of the seismic data). The system can identify the extraneous noise and provide a notification of the noise without stopping the seismic survey. Thus, by identifying the extraneous noise without stopping the seismic survey, the present technical solution can not only improve the quality of subsequently collected seismic data, thereby generating higher quality images, but this technical solution can do so without introducing delays in the seismic survey. By not stopping or introducing delays in the seismic survey, this technical solution can reduce resource utilization associated with battery resources of the seismic data acquisition units that are deployed to collect the seismic data, or other energy resources used in performance of the seismic survey, such as fuel consumed by a marine vessel. Furthermore, this technical solution can reduce the likelihood or prevent the need to re-perform a seismic survey due to extraneous noise in seismic data that can result in poor quality images that may not facilitate identifying subsurface lithological formations or hydrocarbons.

To do so, the present technical solution can process the seismic data using Hough transforms to generate Hough tensors, and then detect the noise from the Hough tensors using a model trained using a machine learning technique and historical seismic data. The Hough tensors can indicate a normal versus abnormal data range for seismic data collected by one or more sensors of one or more seismic data acquisition units, which can be defined through various matrix forms of regions within the Hough tensor and their corresponding eigenvalue and eigenvectors. For example, for each shot input data, the system can select seismic data collected by a particular component or sensor. The system can apply a filter to the seismic data (e.g., 3 Hz low-pass filter). The system can generate a 2-dimensional Fourier transform in two windows of the seismic data. The system can transform the 2-dimensional Fourier transforms to a Hough space. The system can also generate a 1-dimensional transform of multiple channels over the full trace length.

The system can characterize, describe, define or identify the Hough tensor by determining the corresponding eigenvectors and eigenvalues of certain canonical forms of sub-matrix tensors for the data in the Hough space. The system can map or compare these characterized Hough tensors generated for the seismic data to historical noiseless data (e.g., expected data which may include coherent noise which can be expected) and historical abnormal data (e.g., historical data known to contain undesired extraneous noise that is different from expected coherent noise). The system can determine a similarity metric based on the mapping or comparison that indicates how similar these characterized Hough tensors are to the noiseless data and the abnormal data. In some cases, the system can weight these metrics with a second order derivative spike detection of the 1-dimensional transform performed over the full or partial trace length, as these spikes may be desired and indicative of noiseless data. The system can display the weighted and unweighted metrics as threshold graphs that can facilitate identifying the presence of extraneous or undesired noise. The system can use a model trained using the historical noiseless data and the historical abnormal data to determine whether the current Hough tensors correspond to noiseless data or data with extraneous noise.

FIG. 1 is an isometric schematic view that illustrates a non-limiting example of an embodiment of a seismic operation or seismic survey. The seismic survey environment 101 can be an ocean bottom seismic survey in which seismic data acquisition units 30 can be deployed or placed on an ocean bottom. The seismic survey can be a mid-water seismic survey utilizing streamer seismic data acquisition units that can be mid-water or not on the ocean bottom and towed by the marine vessel 5. The seismic survey can be a land-based seismic survey. One more devices, systems, or components of the seismic survey environment 101 can be a cause of an extraneous noise source, including, for example, ocean waves, change in pressure, vibrations caused by mechanical features of or associated with the seismic data acquisition unit (e.g., a housing, rope, tether, cable, vessel, crane, or objects in the water). Other systems and survey operations outside of this survey can also be the source of the extraneous noise. For example, the environment 101 can include a third-party remote vessel not affiliated with the first vessel 5 that may be the source of extraneous noise.

One or more components or operations of the seismic survey environment 101 can be autonomous. For example, one or more operations, such as deployment or retrieval of sensors 30, can be performed autonomously. One or more components, such as the vessel 5, vessel 80, crane 25A, crane 25B, ROV 35A, acoustic source device 85, or seismic data acquisition unit 30 can be autonomous or perform one or more functionality automatically. The one or more autonomous components can perform an operation automatically and without human input during the performance of the operation. For example, the crane 25B can be programmed with instructions that allow the crane 25B to automatically lower the seismic sensor transfer device 100 through the water column 15 for mating with the ROV 35A. The ROV 35A can automatically retrieve the sensors 30 from the transfer device 100, and then automatically position or place the sensors 30 on the seabed. The source device 85 can automatically generate the seismic source, and the sensors 30 can record the seismic data. The ROV 35A can automatically retrieve the sensors 30 with the recorded seismic data, and automatically place the sensors 30 in the transfer device 100. The crane 25B can automatically retrieve the transfer device 100, and position the transfer device 100 on the deck 20 of the vessel 5 in order to remove the sensors 30 from the transfer device 100.

The seismic operation can be in deep water and facilitated by a first marine vessel 5. The first marine vessel 5 can be autonomous in that the first marine vessel 5 can be programmed or otherwise configured to depart from a location and move to a particular destination to deploy or retrieve seismic data acquisition units to facilitate the performance of a seismic survey, as well return back to the original departure location or some other location. The first vessel 5 is positioned on a surface 10 of a water column 15 and includes a deck 20 which supports operational equipment. At least a portion of the deck 20 includes space for a plurality of sensor device racks 90 where seismic sensor devices are stored. The sensor device racks 90 may also include data retrieval devices or sensor recharging devices.

The deck 20 also includes one or more cranes 25A, 25B attached thereto to facilitate transfer of at least a portion of the operational equipment, such as an ROV or seismic sensor devices, from the deck 20 to the water column 15. The cranes 25A and 25B can be autonomous in that the cranes 25A and 25B can be programmed or otherwise configured to automatically perform one or more operations. The crane 25A coupled to the deck 20 can lower and raise an ROV 35A, which transfers and positions one or seismic data acquisition units 30 on a seabed 55. The seabed 55 can include a lakebed 55, ocean floor 55, or earth 55. The ROV 35A can be wireless. The ROV 35A can be autonomous. The ROV 35A can be self-contained. The ROV 35A can be coupled to the first vessel 5 by, for example, a tether 46A and an umbilical cable 44A that provides power, communications, and control to the ROV 35A. A tether management system (TMS) 50A can be coupled between the umbilical cable 44A and the tether 46A. The TMS 50A can automatically provide one or more tether management functionalities. The TMS 50A may be utilized as an intermediary, subsurface platform from which to operate the ROV 35A. In some cases, for ROV 35A operations at or near the seabed 55, the TMS 50A can be positioned approximately 50 feet above seabed 55 and can pay out tether 46A for ROV 35A to move freely above seabed 55 to position and transfer seismic data acquisition units 30 thereon. Seismic data acquisition unit 30 can include a seismic sensor device or non-seismic sensor devices, as well as combinations thereof.

A crane 25B may be coupled (e.g., via a latch, anchor, nuts and bolts, screw, suction cup, magnet, or other fastener) to a stern of the first vessel 5, or other locations on the first vessel 5. Each of the cranes 25A, 25B may be any lifting device or launch and recovery system (LARS) adapted to operate in a marine environment. The crane 25B can be coupled to a seismic sensor transfer device 100 by a cable 70. The transfer device 100 can be an autonomous transfer device 100. The transfer device 100 may be a drone, a skid structure, a basket, or any device capable of housing one or seismic data acquisition units 30 therein. The transfer device 100 may be a structure configured as a magazine adapted to house and transport one or seismic data acquisition units 30. The transfer device 100 can be configured as a sensor device storage rack for transfer of sensor devices 30 from the first vessel 5 to the ROV 35A, and from the ROV 35A to the first vessel 5. The cable 70 may be an umbilical, a tether, a cord, a wire, a rope, and the like, that is configured to support the transfer device 100.

The ROV 35A can include a seismic sensor device storage compartment 40 that is configured to store one or more seismic data acquisition units 30 therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic data acquisition units 30 therein. The seismic data acquisition units 30 may be deployed on the seabed 55 and retrieved therefrom by operation of the movable platform. The ROV 35A may be positioned at a predetermined location above or on the seabed 55 and seismic data acquisition units 30 are rolled, conveyed, or otherwise moved out of the storage compartment 40 at the predetermined location. In some embodiments, the seismic data acquisition units 30 may be deployed and retrieved from the storage compartment 40 by a robotic device 60, such as a robotic arm, an end effector or a manipulator, disposed on the ROV 35A. The robotic device 60 can be configured to autonomously perform one or more functions, such as retrieve a seismic data acquisition unit 30 from a transfer device 100, and position the seismic data acquisition unit 100 on the ocean floor or other desired location.

The seismic data acquisition unit 30 may include a sensor in an oil production field, and can be a seismic data acquisition unit or node. The seismic data acquisition unit 30 can record seismic data. Seismic data can include, for example, data collected by the one or more sensors of the device 30 such as trace data, force data, motion data, pressure data, vibration data, electrical current or voltage information indicative of force or pressure, temperature data, or tilt information. The seismic data acquisition unit 30 can include one or more sensors or components. The seismic data acquisition unit 30 may include one or more of at least one motion detector such as a geophone, at least one pressure detector such as a hydrophone, at least one power source (e.g., a battery, external solar panel), at least one clock, at least one tilt meter, at least one environmental sensor, at least one seismic data recorder, at least one global positioning system sensor, at least one wireless or wired transmitter, at least one wireless or wired receiver, at least one wireless or wired transceiver, or at least one processor. The seismic data acquisition unit 30 may be a self-contained unit such that all electronic connections are within the seismic data acquisition unit 30, or one or more components can be external to the seismic data acquisition unit 30. During recording, the seismic data acquisition unit 30 may operate in a self-contained manner such that the node does not require external communication or control. The seismic data acquisition unit 30 may include several geophones and hydrophones configured to detect acoustic waves that are reflected by subsurface lithological formation or hydrocarbon deposits. The seismic data acquisition unit 30 may further include one or more geophones that are configured to vibrate the seismic data acquisition unit 30 or a portion of the seismic data acquisition unit 30 in order to detect a degree of coupling between a surface of the seismic data acquisition unit 30 and a ground surface. One or more component of the seismic data acquisition unit 30 may attach to a gimbaled platform having multiple degrees of freedom. For example, the clock may be attached to the gimbaled platform to minimize the effects of gravity on the clock.

The device 30 can include or refer to other types of sensors, components, or units used in oilfield or hydrocarbon operations, production or exploration. The device 30 can record, detector, collect or obtain data related to oil field production or hydrocarbon production. The device 30 can collect data related to oil field production or hydrocarbon production that includes, for example, pressure information (e.g., pressure of oil or other fluid flowing through a pipe), temperature data (e.g., ambient temperature, temperature of a fluid flowing through a pipe, or temperature of a component or device), current flow (e.g., water flow or rate in an aqueous medium, river or ocean).

For example, in a deployment operation, a first plurality of seismic sensor devices, comprising one or seismic data acquisition units 30, may be loaded into the storage compartment 40 while on the first vessel 5 in a pre-loading operation. The ROV 35A, having the storage compartment coupled thereto, is then lowered to a subsurface position in the water column 15. The ROV 35A can utilize commands from personnel on the first vessel 5 to operate along a course to transfer the first plurality of seismic data acquisition units 30 from the storage compartment 40 and deploy the individual sensor devices 30 at selected locations on the seabed 55. Once the storage compartment 40 is depleted of the first plurality of seismic data acquisition units 30, the transfer device 100 is used to ferry a second plurality of seismic data acquisition units 30 as a payload from first vessel 5 to the ROV 35A.

The transfer system 100 may be preloaded with a second plurality of seismic data acquisition units 30 while on or adjacent the first vessel 5. When a suitable number of seismic data acquisition units 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic data acquisition units 30 from the transfer device 100 to the storage compartment 40. When the transfer device 100 and ROV 35A are mated, the second plurality of seismic data acquisition units 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. Reloading of the storage compartment 40 can be provided while the first vessel 5 is in motion. If the transfer device 100 is empty after transfer of the second plurality of seismic data acquisition units 30, the transfer device 100 may be raised by the crane 25B to the vessel 5 where a reloading operation replenishes the transfer device 100 with a third plurality of seismic data acquisition units 30. The transfer device 100 may then be lowered to a selected depth when the storage compartment 40 is reloaded. This process may repeat as until a desired number of seismic data acquisition units 30 have been deployed.

Using the transfer device 100 to reload the ROV 35A at a subsurface location can reduce the time required to place the seismic data acquisition units 30 on the seabed 55, or "planting" time, as the ROV 35A is not raised and lowered to the surface 10 for seismic sensor device reloading. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

The sensor devices 30 can be placed on seabed 55 for an extended duration, such as 1 year, 2 years, 3 years, 4 years, 5 years, or more. Data, such as seismic data or status data, can be retrieved from the sensor devices 30 while they are located on the seabed 55 using wireless transmission techniques, such as optical links.

In a retrieval operation, the ROV 35A can utilize commands from personnel on the first vessel 5 to retrieve each seismic data acquisition unit 30 that was previously placed on seabed 55. In some cases, the ROV 35A can autonomously retrieve seismic data acquisition units 30 without having to receive commands from personnel on the first vessel 5. The retrieved seismic data acquisition units 30 are placed into the storage compartment 40 of the ROV 35A. In some embodiments, the ROV 35A may be sequentially positioned adjacent each seismic data acquisition unit 30 on the seabed 55 and the seismic data acquisition units 30 are rolled, conveyed, or otherwise moved from the seabed 55 to the storage compartment 40. In some embodiments, the seismic data acquisition units 30 may be retrieved from the seabed 55 by a robotic device 60 disposed on the ROV 35A.

Once the storage compartment 40 is full, contains a pre-determined number of seismic data acquisition units 30, or is otherwise ready, the transfer device 100 is lowered to a position below the surface 10 and mated with the ROV 35A. The transfer device 100 may be lowered by crane 25B to a selected depth in the water column 15, and the ROV 35A and transfer device 100 are mated at a subsurface location. The crane 25B can automatically lower the transfer device 100 for mating with the ROV 35A at the subsurface location. Once mated, the retrieved seismic data acquisition units 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 is used to ferry the retrieved seismic data acquisition units 30 as a payload to the first vessel 5, allowing the ROV 35A to continue collection of the seismic data acquisition units 30 from the seabed 55. In this manner, sensor device retrieval time is significantly reduced as the ROV 35A is not raised and lowered for sensor device unloading. Further, safety issues and mechanical stresses placed on equipment related to the ROV 35A are minimized as the ROV 35A may be subsurface for longer periods.

The first vessel 5 may travel in a first direction 75, such as in the +X direction, which may be a compass heading or other linear or predetermined direction. The first vessel 5 can automatically travel in the first direction 75 based on initial instructions, input parameters, or navigation instructions. In some cases, the first vessel 5 can automatically select or determine the first direction 75 based on receiving a coordinates for a destination. The first direction 75 may also account for or include drift caused by wave action, current(s) or wind speed and direction. In one embodiment, the plurality of seismic data acquisition units 30 are placed on the seabed 55 in selected locations, such as a plurality of rows Rn in the X direction (R1 and R2 are shown) or columns Cn in the Y direction (C1-Cn are shown), wherein n equals an integer. In one embodiment, the rows Rn and columns Cn define a grid or array, wherein each row Rn (e.g., R1-R2) comprises a receiver line in the width of a sensor array (X direction) or each column Cn comprises a receiver line in a length of the sensor array (Y direction). The distance between adjacent sensor devices 30 in the rows is shown as distance LR and the distance between adjacent sensor devices 30 in the columns is shown as distance LC. While a substantially square pattern is shown, other patterns may be formed on the seabed 55. Other patterns include non-linear receiver lines or non-square patterns. The pattern(s) may be pre-determined or result from other factors, such as topography of the seabed 55. The distances LR and LC may be substantially equal and may include dimensions between about 60 meters to about 400 meters, or greater. The distance between adjacent seismic data acquisition units 30 may be predetermined or result from topography of the seabed 55 as described above.

The first vessel 5 can be operated at a speed, such as an allowable or safe speed for operation of the first vessel 5 and any equipment being towed by the first vessel 5. The first vessel 5 can automatically determine the speed at which to operate based on various factors or conditions in real-time or during operation. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed can be limited by the drag coefficients of components of the ROV 35A, such as the TMS 50A and umbilical cable 44A, as well as any weather conditions or currents in the water column 15. The first vessel 5 can automatically determine the speed limit based on such drag coefficients. As the components of the ROV 35A are subject to drag that is dependent on the depth of the components in the water column 15, the first vessel speed may operate in a range of less than about 1 knot. In this embodiment, wherein two receiver lines (rows R1 and R2) are being laid, the first vessel includes a first speed of between about 0.2 knots and about 0.6 knots. In other embodiments, the first speed includes an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row R1 may be deployed. When the single receiver line is completed a second vessel 80 is used to provide a source signal. The second vessel 80 is provided with a source device or acoustic source device 85, which may be a device capable of producing acoustical signals or vibrational signals suitable for obtaining the survey data. The source signal propagates to the seabed 55 and a portion of the signal is reflected back to the seismic data acquisition units 30. The second vessel 80 may be required to make multiple passes, for example at least four passes, per a single receiver line (row R1 in this example). During the time the second vessel 80 is making the passes, the first vessel 5 continues deployment of a second receiver line. However, the time involved in making the passes by the second vessel 80 may be much shorter than the deployment time of the second receiver line. This causes a lag time in the seismic survey as the second vessel 80 sits idle while the first vessel 5 is completing the second receiver line. The first vessel 5, second vessel 80, and acoustic source device 85 can perform one or more operations of the seismic survey autonomously and without human or manual input or commands during the seismic operation. For example, the first vessel 5, second vessel 80 and acoustic source device 85 can automatically communicate with one another to orchestrate one or more travel paths or sequences and generating acoustic or vibrational signals suitable for obtaining seismic data.

The first vessel 5 can use one ROV 35A to lay sensor devices to form a first set of two receiver lines (rows R1 and R2) in any number of columns, which may produce a length of each receiver line of up to and including several miles. The two receiver lines (rows R1 and R2) can be parallel or substantially parallel (e.g., less than 1 degree off parallel, 2 degrees off parallel, 0.5 degrees off parallel, 0.1 degrees off parallel, or 5 degrees off parallel). When a single directional pass of the first vessel 5 is completed and the first set (rows R1, R2) of seismic data acquisition units 30 are laid to a predetermined length, the second vessel 80, provided with the source device 85, is utilized to provide the source signal. The second vessel 80 can make eight or more passes along the two receiver lines to complete the seismic survey of the two rows R1 and R2.

While the second vessel 80 is shooting along the two rows R1 and R2, the first vessel 5 may turn 180 degrees and travel in the X direction in order to lay seismic data acquisition units 30 in another two rows adjacent the rows R1 and R2, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows R1 and R2 are shown, the seismic data acquisition unit 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array can be limited by the length of the tether 46A or the spacing (distance LR) between sensor devices 30.

Figure 2:
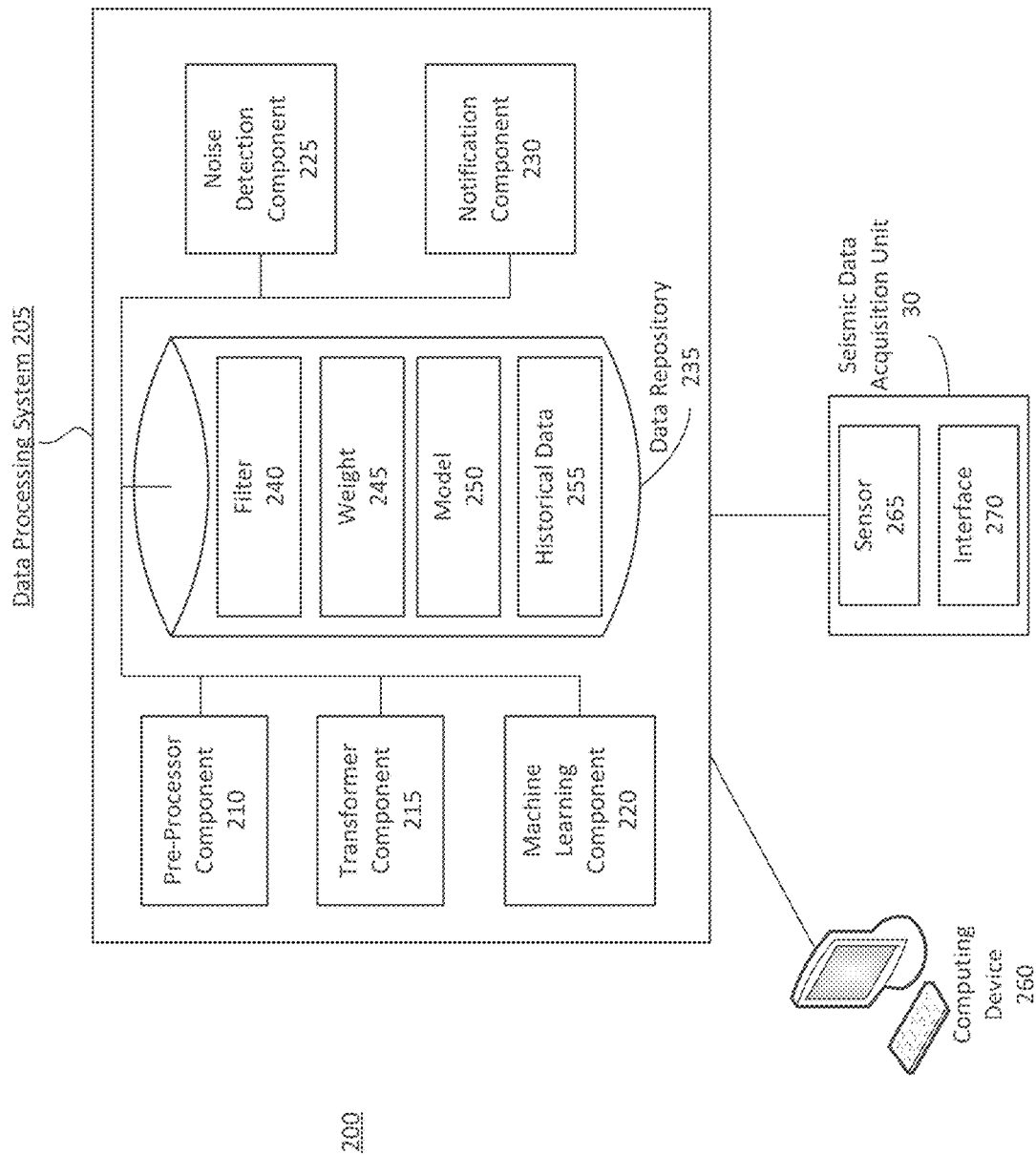
FIG. 2 depicts an illustration of a system for real-time identification of extraneous noise in seismic surveys, in accordance with an implementation.

FIG. 2 depicts an illustration of a system for real-time identification of extraneous noise in a seismic survey. The system 200 can include a data processing system 205. The data processing system 205 can receive data from one or more seismic data acquisition units 30 via an interface of the seismic data acquisition unit 30. The seismic data acquisition unit can include one or more sensors 265 that collect seismic data. The data processing system 205 can be communicatively coupled to a computing device 260, which can include a display device to output visual data, and an input device to receive input. The computing device 260 can include one or more component or functionality of computing system 1000 depicted in FIG. 10. For example, the computing device 260 can include a laptop computer, desktop computer, tablet computer, or smartphone. The data processing system 205 can include at least one pre-processor component 210. The data processing system 205 can include at least one transformer component 215. The data processing system 205 can include at least one machine learning component 220. The data processing system 205 can include at least one notification component 230. The data processing system 205 can include at least one noise detection component 225. The data processing system 205 can include at least one data repository 235.

The pre-processor component 210, transformer component 215, machine learning component 220, notification component 230, noise detection component 225 or other component of the data processing system 205 can each include or utilize at least one processing unit or other logic device such as programmable logic array engine, or module configured to communicate with one another or other resources or databases. The pre-processor component 210, transformer component 215, machine learning component 220, notification component 230, noise detection component 225 or other components of the data processing system 205 can be separate components, a single component, or part of the data processing system 205. The system 200 and its components, such as the data processing system 205, can include hardware elements, such as one or more processors, logic devices, or circuits. Components, systems or modules of the data processing system 205 can be executed at least partially by the data processing system 205.

The data repository 235 can include one or more data structure, data files, databases, records, fields, tables or data that facilitates real-time identification of extraneous noise during a seismic survey. For example, the data repository 235 can include filters 240, weights 245, models 250, or historical data 255. Historical data 255 can refer to or include historical seismic data, noisy historical seismic data, nominal historical seismic data, noisy historical Hough tensors, or nominal or noiseless historical Hough tensors. Models 250 can refer to or include models trained or generated using a machine learning component 220 to facilitate detection of extraneous noise based on Hough tensors. Weights 245 can refer to or include weights applied to eigenvalues based on detecting a spike in 1D DFT transform of seismic data in a window. The weight can be a numerical value such as 1, 2, 3, 4. The weight can be a percentage or fraction, such as 10%, 20%, 30%, or 0.1, 0.2, or 0.3. Filter 240 can refer to a low pass filter, bandpass filter or high pass filter. The filter 240 can refer to or include a filter having a frequency, such as a 3 Hz low pass filter, 2 Hz low pass filter, 4 Hz low pass filter, or other filter 240 that can facilitate real-time identification of extraneous noise in a seismic survey.

The data processing system 205 can communicate with one or more system, component or device of system 200 using a network. The network can be used by the data processing system 205 to access information resources such as applications, models, historical data, instructions, programs, or other data. The network may be any type or form of wired or wireless network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network may include a wireless link, such as an infrared channel or satellite band. The topology of the network may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The seismic data acquisition unit 30 can include one or more sensors 265, such as a geophone, hydrophone, or reference sensor (or reference coil). Types of sensors 265 can include an accelerometer, optical sensor, or electromagnetic sensor, for example. The hydrophone can measure pressure. The geophone can measure vertical particle motion. The reference coil can measure or determine a correction factor. The seismic data acquisition unit 30 can include five sensors or components, such as a pressure sensor, three vertical particle motion sensors (e.g., x dimension, y dimension, and z dimension), and a complex sensor that can detect both pressure and particle motion and can be used as a reference sensor.

The data processing system 205 can receive a pre-processor component 210 designed, constructed and operational to receive seismic data and apply an initial pre-processing technique to the received seismic data. The pre-processor component 210 can receive the seismic data in real-time. The pre-processor component 210 can receive the seismic data during a shot interval of the seismic survey. The pre-processor component 210 can receive the seismic data upon completion of a shot interval. The shot interval can last for any duration, such as a 10 second duration. The pre-processor can receive seismic data collected by one or more components of the seismic data acquisition unit 30 during the shot interval. The pre-processor component 210 can receive seismic data collected from multiple seismic data acquisition units 30. For example, the pre-processor component 210 can receive seismic data that includes 100, 200, 300, 500, 1000, 2000, 3000, 5000, 10,000, 15,000, 20,000 or more channels. A channel can refer to or correspond to a seismic data acquisition unit 30 or component thereof. The seismic data can include 10 seconds worth of data collected over 20,000 channels for each of 5 different components or sensors, for example.

Thus, the data processing system 205 can receive, responsive to a seismic wave (e.g., source signal or acoustic wave) generated by a source (e.g., acoustic source device 85), seismic data detected by a sensor component (e.g., sensor 265) of a seismic data acquisition unit 30. The seismic data acquisition unit 30 can refer to one or more ocean bottom seismic data acquisition units 30, or one or more seismic data acquisition units 30 deployed as part of a seismic streamer located in an aqueous medium that includes multiple seismic data acquisition units. The sensor component can be a hydrophone, pressure sensor, geophone, particle motion sensor, or complex sensor acting as a reference coil.

The pre-processor component 210 can receive raw seismic data. The raw seismic data can refer to seismic data that has not been processed. Raw seismic data can refer to seismic data that is received from a seismic data acquisition unit that has not yet been processed or manipulated by any device separate from the seismic data acquisition unit. For example, a high speed recorder of the seismic data acquisition unit 30 can store the data, and an interface 270 (e.g., a communication interface, network interface, or other communication port) can provide the seismic data to data processing system 205.

The data processing system 205, upon receiving the seismic data, can determine to pre-process the data or to not pre-process the data. In some cases, the data processing system 205 can forward the received data to the transfer component 215 for further processing. In some cases, the data processing system 205 (e.g., via pre-processor component 210) can determine to apply a filter to the seismic data. For example, the data processing system 205 can determine to apply a low-pass filter, high-pass filter, bandpass filter, Kalman filter, or other type of filter. In some cases, the data processing system 205 can determine to identify void samples and smooth the void samples in the seismic data using a smoothing function. The data processing system 205 can apply any type of filter having any cutoff frequency. For example, the data processing system 205 can apply a low-pass filter having a cutoff frequency of 1 Hz, 2 Hz, 3 Hz, 4 Hz, 5 Hz, or other frequency that facilitates real-time identification of extraneous noise. Thus, the pre-processor component 210 can apply a filter to remove predetermined frequencies from the seismic data prior to subsequent downstream processing of the data by the transfer component 215.

The data processing system 205 can provide the seismic data to the transfer component 215. The data processing system 205 can provide the filtered data to the transformer component 215. For example, upon filtering the seismic data using a 3 Hz low pass filter, the pre-processor can forward the filtered seismic data to the transformer component 215. In some case, the pre-processor component 210 can store the filtered data in data repository 235, and provide an indication or instruction to the transformer component 215 to receiving the filtered data stored in the data repository 235.

The data processing system 205 can include a transformer component 215 designed, constructed and operational to generate Hough tensors for seismic data transforms in multiple dimensions. The transformer component 215 can generate a seismic data transform in multiple dimensions based on the seismic data. The transformer component 215 can generate Hough tensors for one or more windows of the seismic data transform. The transformer component 215 can generate different types of seismic data transforms, including, for example, a 2-dimensional Fourier transform, a tau-p transform, a Radon transform, or a curvelet transform.

A Fourier transform can refer to a transform that decomposes the seismic data into its constituent frequency. A tau-p transform can refer to a discrete transform based upon the Radon transform that can be used to map seismic data to a domain of intercept time and event slope. A Radon transform can refer to a mapping of a 2-dimensional seismic data set defined over a rectangular set of coordinates onto a domain defied by the intercept and slope of curves in the t-x domain. The curvelet transform can refer to a multiscale directional transform that is based on a wavelet. For example, wavelets can generalize the Fourier transform by using a basis that represents both location and spatial frequency. Directional wavelets can use basis functions that are also localized in orientation. A curvelet transform can differ from directional wavelet transforms in that the degree of localization in orientation can vary with scale.

Figure 4:
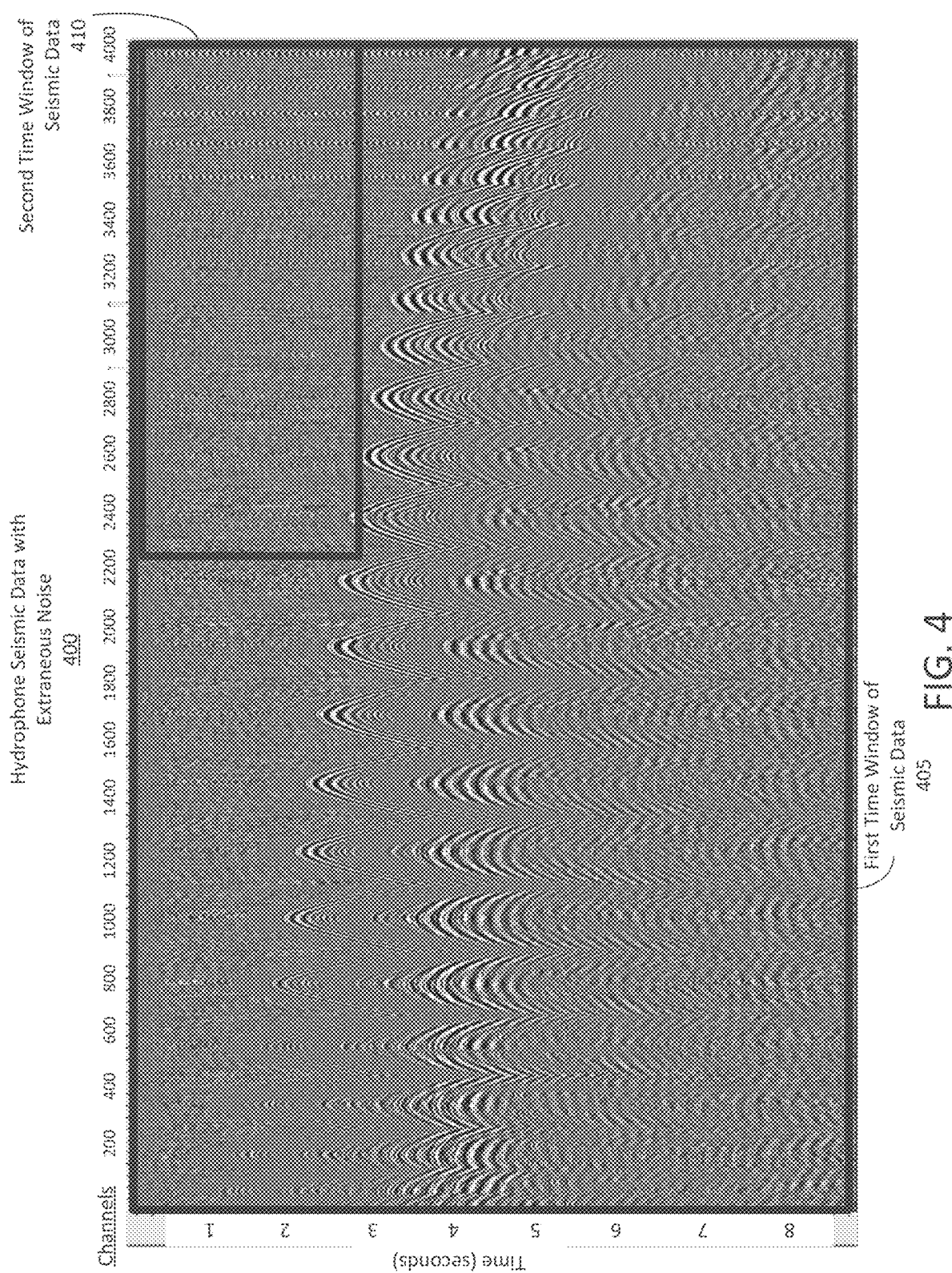
FIG. 4 depicts a diagram of seismic data from a shot interval collected by a hydrophone component, in accordance with an implementation.

For example, the transformer component can generate 2-dimensional Fourier transforms of windows of the seismic data. The transformer component 215 can generate the Hough tensors for the 2-dimensional Fourier transforms of the windows of the filtered seismic data (e.g., without the predetermined frequencies of data that are filtered out or removed using the low pass filter). In an illustrative example, a seismic survey can be performed using five components and with 20,000 traces during a shot interval. FIG. 4 depicts an example of an image 400 of seismic data collected for a shot interval. FIG. 4 illustrates data collected by a hydrophone, such as a pressure component, of the seismic data acquisition unit. The vertical y-axis represents time in seconds, while the horizontal x-axis represents channels. The seismic data can contain 400 channels for each component, which can be a total of 20,000 channels over all five components. The image 400 contains two time windows. A first time window 405 represents the entire trace length (e.g., 8.5 seconds in this example) by 4000 channels of seismic data, and the second time window represents 3 seconds by 1800 channels of seismic data. Each channel can refer to component or sensor that collects seismic data. In this seismic survey, there can be 400 seismic data acquisition units, and each seismic data acquisition unit can include five components or sensors, thereby totaling 20,000 channels worth of seismic data collected over each shot interval (e.g., 10 seconds).

The transformer component 215 can use any technique to select one more time windows of seismic data for processing. The transformer component 215 can be configured with predetermined time windows to select. A first time window 405 can correspond to the entire set of seismic data collected for a component over an entire shot interval (e.g., 10 seconds by 4000 channels). The second time window 410 can be a subset of the first time window 405. The second time window 410 can correspond to an upper right corner of the image 400. The second time window 410 can be configured as predetermined number of seconds by a predetermined number of channels. The second time window 410 can be configured as a predetermined range of seconds by a predetermined range of channels. In some cases, the transfer component 215 can automatically select the second time window 410 based on processing the seismic data. For example, the transformer component 215 can select the second time window 410 as a subset of seismic data that has certain characteristics, such as an amplitude below a predetermined threshold, data that represents shallow measurements, data that may not include indications of lithological or hydrocarbon formations. The second time window of seismic data can correspond to data collected at the beginning of the shot interval (e.g., first 3 second) and by the components that are located furthest from the acoustic source, for example. To generate the windows seismic data, the data processing system 205 can apply a window function to the seismic data having the desired properties, such as values of one for seismic data falling within the time window, and a value of zero for seismic data falling outside the time window. The data processing system 205 can apply the time window function to the seismic data to generate the desired windowed seismic data by multiplying the seismic data with the window function.

The transformer component 215 can transform the seismic data into a sparse domain. The transformer component 215 can generate seismic data transforms using any type of transform, such as a Fourier transform, tau-p transform, radon transform, or curvelet transform. For example, the transformer component 215 can transform the seismic data into a sparse domain using a 1-dimensional ("1D") Fourier transform or Discrete Fourier Transform ("DFT"). The transformer component 215 can transform the seismic data into the sparse domain using a 2-dimensional ("2D") DFT. The transformer component 215, to facilitate real-time identification of extraneous noise during a seismic survey, can be configured with hardware and software to transform 20,000 traces in 3 seconds or less, which can include the time to read the seismic data and transfer the transformed seismic data to memory of the data processing system 205 (e.g., data repository 235).

Figure 5:
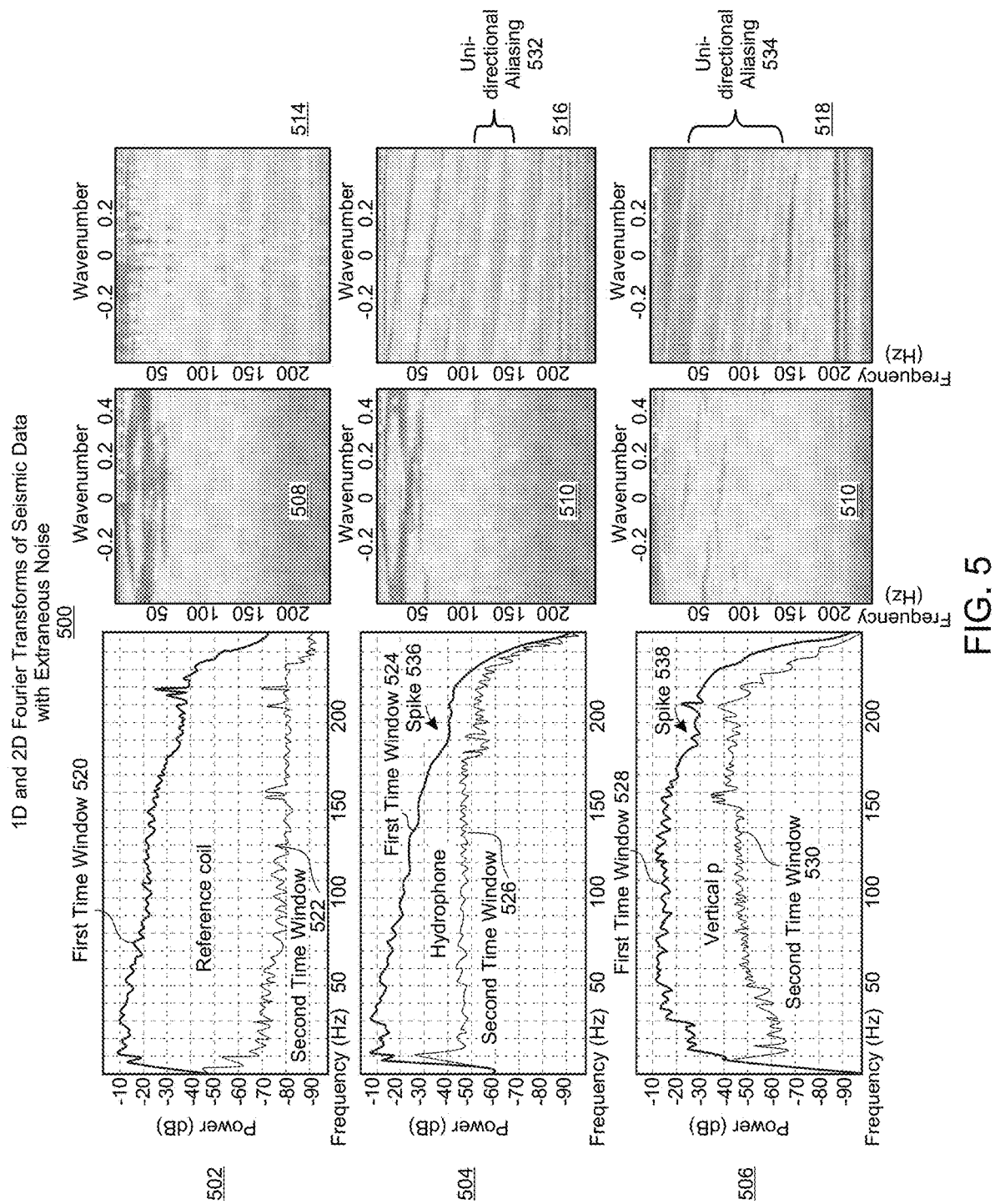
FIG. 5 depicts diagrams illustrating seismic data having extraneous noise, in accordance with implementations.

FIG. 5 depicts 1D and 2D transforms 500 for seismic data with extraneous noise across 3 components generated by the transformer component 215. The vertical axis for the 1D DFT diagrams 502, 504 and 506 is power in decibels ("dB"), and the horizontal axis is frequency in Hz. The 1D DFT transform for a first time window 520 and a second time window 522 for the reference coil component is depicted in diagram 502. The 1D DFT transform for a first time window 524 and a second time window 526 for the hydrophone component is depicted in diagram 504. The 1D DFT transform for a first time window 528 and a second time window 530 for the vertical particle motion sensor component is depicted in diagram 506. The vertical axis for the 2D DFT images 508, 510, 523, 514, 516 and 518 is frequency in Hz, and the horizontal axis is wave number. The 2D DFT for the first time window 520 of the reference coil component is depicted in image 508. The 2D DFT for the second time window 522 of the reference coil component is depicted in image 514. The 2D DFT for the first time window 524 of the hydrophone component is depicted in image 510. The 2D DFT for the second time window 526 of the hydrophone component is depicted in image 516. The 2D DFT for the first time window 528 of the vertical particle motion sensor component is depicted in image 512. The 2D DFT for the second time window 530 of the vertical particle motion sensor component is depicted in image 518. The first time windows 520, 524 and 528 can correspond to a full time window for a respective component across all traces (e.g., first time window 405 depicted in FIG. 4). The second time windows 522, 526 and 530 can correspond to a subset of the full time window for a respective component, such as a subset of traces and duration (e.g., similar to second time window 410 depicted in FIG. 4). The extraneous noise can result in a noisy spectra pattern. Among other noise spectra patterns generated, unwanted or extraneous noise can result a noise spectra pattern that includes uni-directional aliasing 532 and 534 in the 2D Fourier transform images 516 and 518.

To automatically detect extraneous noise in real-time that can result in such example noisy spectra patterns 532 and 534 in the 2D DFT transforms depicted in images 516 and 518, the transformer component 215 of this technical solution can transform the 2D DFTs to a Hough space. The transformer component 215 can perform a Hough transform on the 2D DFT for each component. A Hough transform can refer to a feature extraction technique used in image analysis, computer vision, or digital image process. The transformer component 215 can use the Hough transform to identify extraneous noise in the seismic data that correspond to a certain class of shapes using a voting procedure. This voting procedure can be carried out in a parameter space, from which object candidates can be obtained as local maxima in a Hough accumulator space (e.g., Hough accumulator space 604 depicted in FIG. 6) that can be determined for the Hough transform. The Hough transforms can facilitate machine learning assisted image detection to detect edges and lines. The transformer component 215 can be configured with hardware and software to perform with minimal delay or latency, such as within a few seconds of the shot interval. For example, the transformer component 215 can perform the Hough transform using a manipulation of the Fourier transform in order to transform the 2D DFT into the Hough space in approximately 2 seconds, 3 seconds, 4 seconds, 5 seconds, 6 seconds or other time interval that facilitates real-time identification of extraneous noise. For example, the transformer component 215 can generate Hough tensors for all 20,000 traces in approximately 2 seconds (e.g., plus or minus 10%, 20%, 30%, 40% or 50%). For example, the transformer component 215 can generate Hough tensors based on the 400 traces of each of the five components. The transformer component 215, to reduce latency and facilitate real-time noise identification during a seismic survey, can generate the Hough tensors for each component in parallel (e.g., five parallel processes each transforming 400 traces into Hough tensors).

Figure 6:
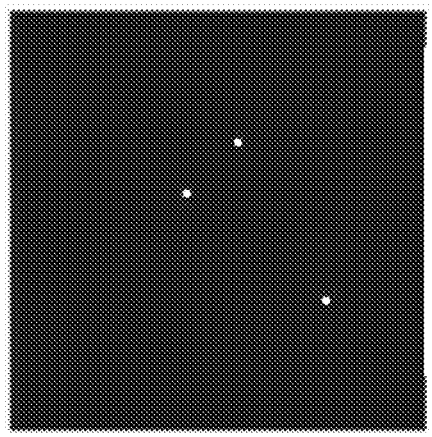
FIG. 6 depicts diagrams illustrating transforming a 2D DFT image to a Hough accumulator space and Hough tensors via the system of FIG. 1 or method of FIG. 2, in accordance with implementations.
Figure 6:
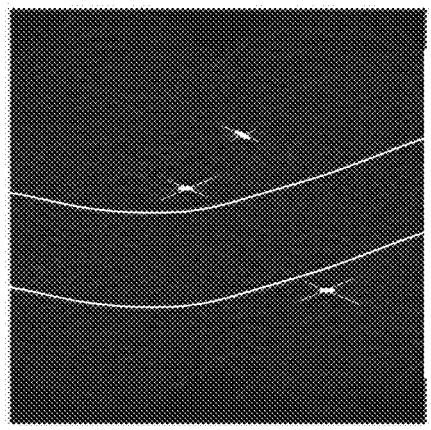
Figure 6:
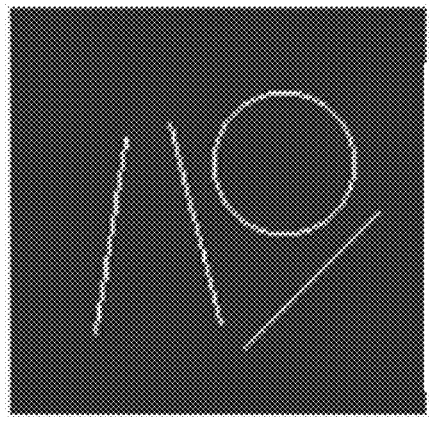

The Hough tensors can correspond to a refined tensor matrix. The transformer component 215 can filter the Hough transform of the 2D DFT to generate Hough tensors corresponding to the refined tensor matrix. FIG. 6 illustrates a series of images 600 depicting example transformations of seismic data to a 2D DFT space such as frequency-wavenumber, Hough accumulator space, to Hough tensors. FIG. 6 illustrates an example 2D DFT image 602 that the transformer component 215 can generate. The 2D DFT image 602 illustrates three lines at various angles and a circle. The transformer component 215 can perform a Hough transform on the image 602 to transform the 2D DFT into a Hough accumulator space 604. The Hough transform can transform the three lines and circle in the 2D DFT into three points marked by X and two curves that extend from the bottom of image 604 to the top of image 604. The transformer component 215 can then filter the data in the Hough accumulator space to generate Hough tensors depicted in image 606. The Hough tensors, which are represented in image 606 as three points, can correspond to the three lines in the 2D DFT in image 602. Each Hough tensor point can represent a collinear set of points in the 2D DFT.

Figure 7:
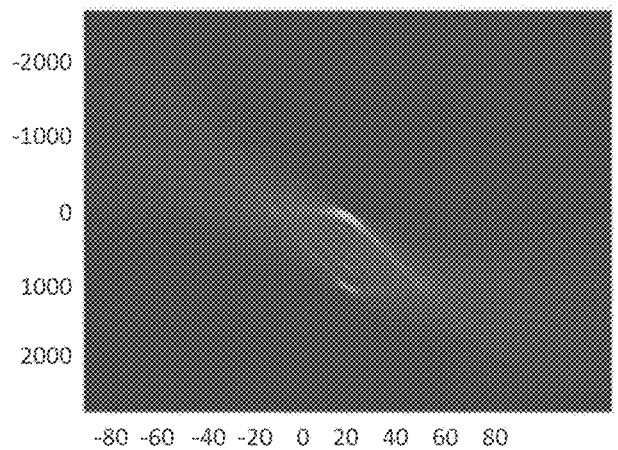
FIG. 7 depicts diagrams illustrating Hough accumulators generated via the system of FIG. 1 or method of FIG. 2, in accordance with implementations.
Figure 7:
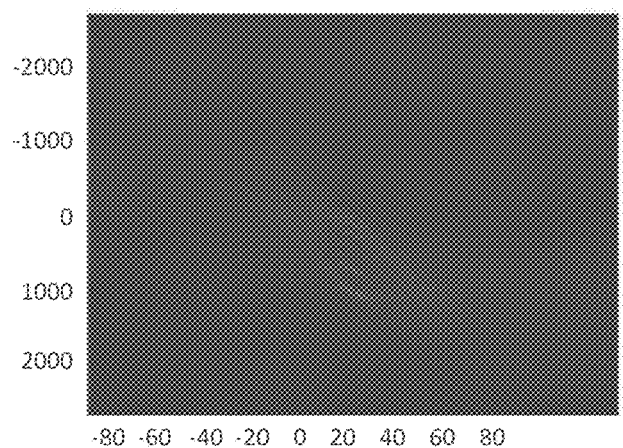
Figure 7:
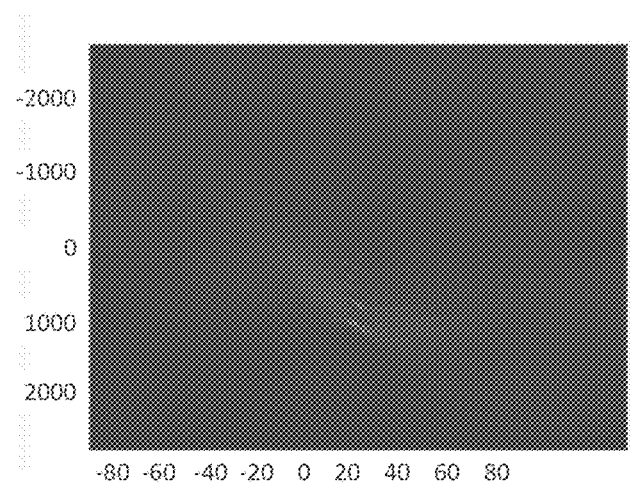

FIG. 7 depicts an illustrative example of Hough accumulator spaces 700 representing extraneous noise from a seismic survey. The Hough accumulator space 708 corresponds to seismic data collected by the reference coil component. The data processing system 205 can create the Hough accumulator by scanning the image to transform along a series of radial lines front the center of the image and adding up or accumulating the pixel response along these lines. The x axis (horizontal) can be the angle of the scan direction and the y axis (vertical) can be the radial distance in pixels, which can provide a relative measure.

The transformer component 215 can generate the Hough accumulator space 708 by performing a Hough transform on a seismic data transform, such as the 2D DFT of the first time window 508 of the reference coil component, or by performing a Hough transform on the 2D DFT of the second time window 514 of the reference coil component depicted in FIG. 5. The transformer component 215 can generate the Hough accumulator space 710 by performing a Hough transform on the 2D DFT of the first time window 510 of the hydrophone component, or by performing a Hough transform on the 2D DFT of the second time window 516 of the hydrophone component depicted in FIG. 5. The transformer component 215 can generate the Hough accumulator space 712 by performing a Hough transform on the 2D DFT of the first time window 512 of the vertical particle motion sensor component, or by performing a Hough transform on the 2D DFT of the second time window 518 of the vertical particle motion sensor component depicted in FIG. 5.

As illustrated by the images depicted the Hough accumulator spaces 708, 710, and 712, the transformer component 215 can be configured with a boundary condition that can prevent vertical features from causing issues. Further, the Hough accumulator spaces can generate an image or data similar to a linear radon or TauP transform, but by an order of magnitude faster. For example, the transformer component 215 can generate the Hough accumulator space for 20,000 traces in 2 seconds, whereas it may take at least 20 seconds or more to generate a linear radon or TauP transform of this data.

Figure 8:
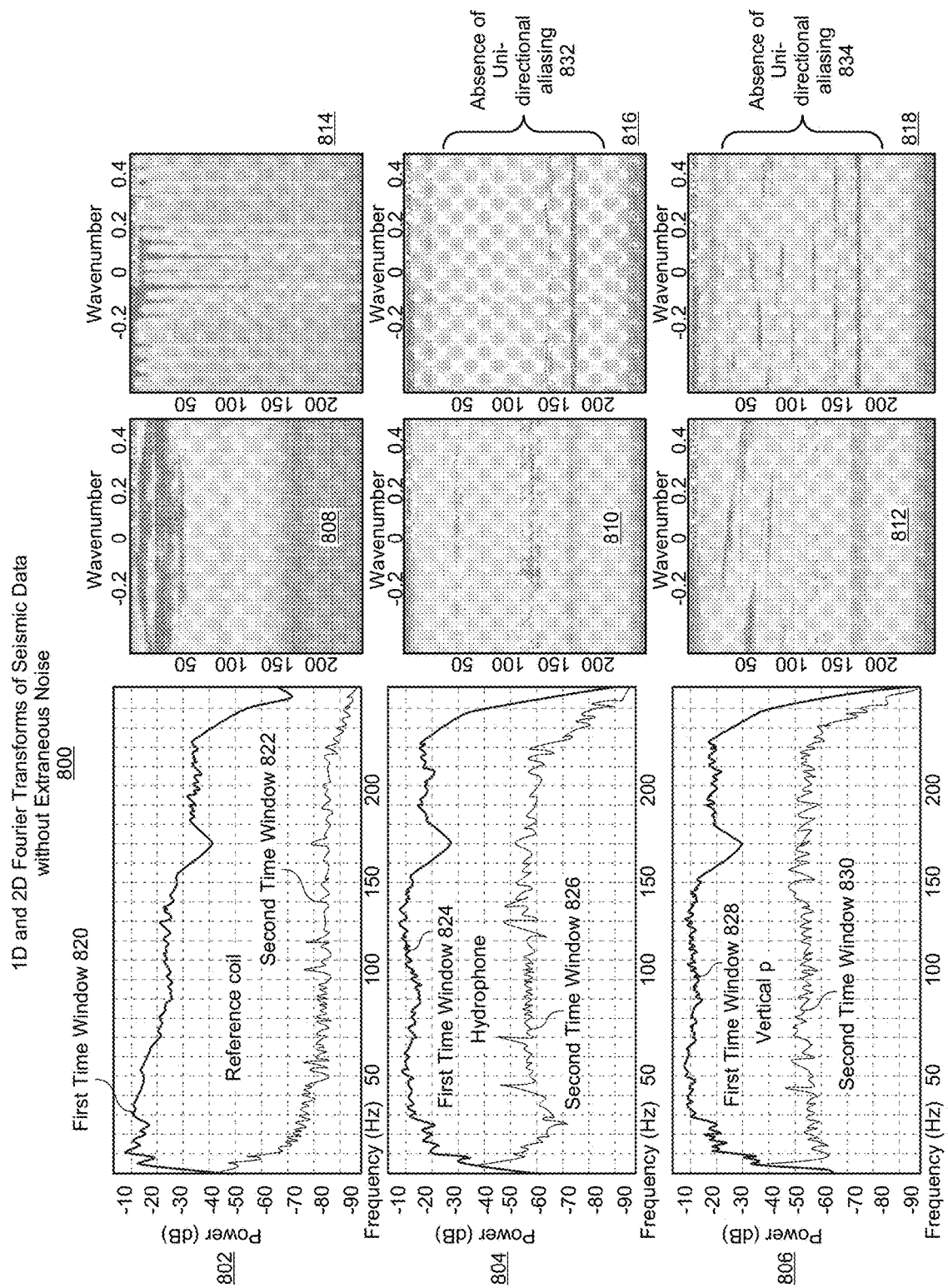
FIG. 8 depicts diagrams illustrating seismic data without extraneous noise, in accordance with implementations.

FIG. 8 depicts the 1D and 2D transforms 800 for noiseless seismic data across 3 components. Noiseless data can refer to seismic data that does not contain extraneous noise. Rather, the noise in the seismic data can be coherent noise or expected noise. The 1D DFT transform for a first time window 820 and a second time window 822 for the reference coil component is depicted in diagram 802. The 1D DFT transform for a first time window 824 and a second time window 826 for the hydrophone component is depicted in diagram 804. The 1D DFT transform for a first time window 828 and a second time window 830 for the vertical particle motion sensor component is depicted in diagram 806. The 2D DFT for the first time window 820 of the reference coil component is depicted in image 808. The 2D DFT for the second time window 822 of the reference coil component is depicted in image 814. The 2D DFT for the first time window 824 of the hydrophone component is depicted in image 810. The 2D DFT for the second time window 826 of the hydrophone component is depicted in image 816. The 2D DFT for the first time window 828 of the vertical particle motion sensor component is depicted in image 812. The 2D DFT for the second time window 830 of the vertical particle motion sensor component is depicted in image 818. The first time windows 820, 824 and 828 can correspond to a full time window for a respective component across all traces. The second time windows 822, 826 and 830 can correspond to a subset of the full time window for a respective component, such as a subset of traces and duration. As this seismic data does not contain extraneous noise, the 2D DFT images 816 and 818 illustrate the absence of uni-directional aliasing 832 and 834.

Figure 9:
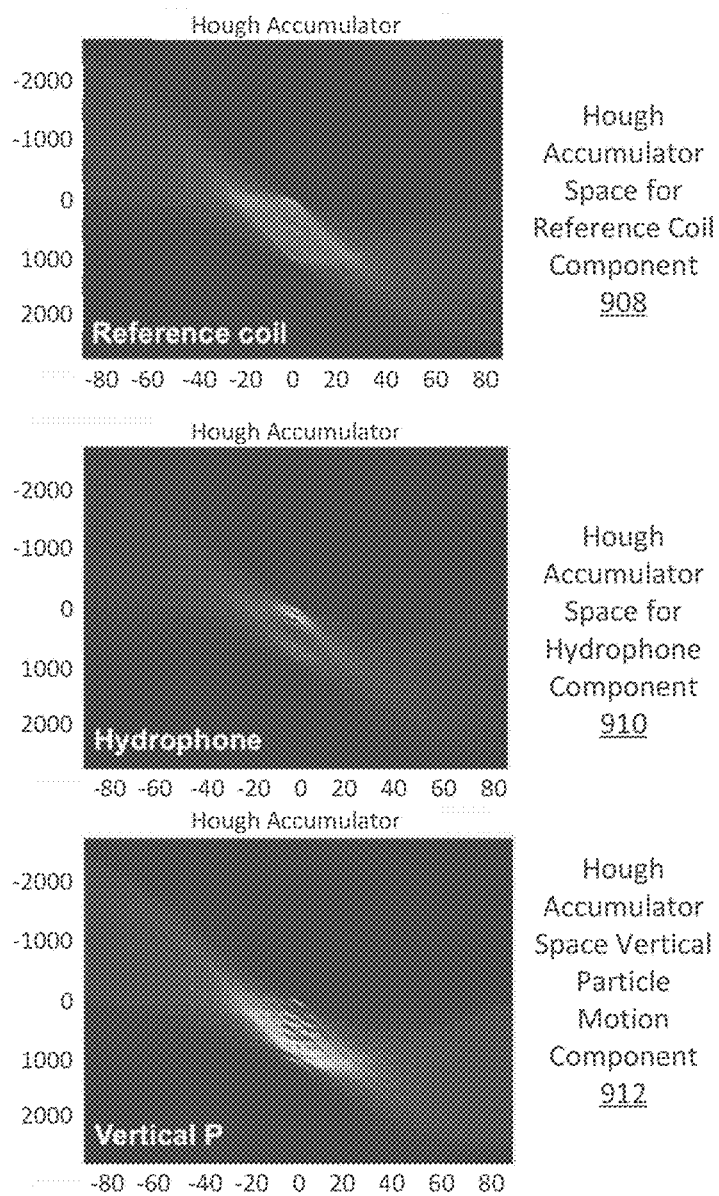
FIG. 9 depicts diagrams illustrating Hough accumulators generated via the system of FIG. 1 or method of FIG. 2, in accordance with implementations.

FIG. 9 depicts an illustrative example of a Hough accumulator spaces 900 for seismic data that lacks extraneous noise from a seismic survey. The Hough accumulator space 908 corresponds to seismic data collected by the reference coil component. The transformer component 215 can generate the Hough accumulator space 908 by performing a Hough transform on the 2D DFT of the first time window 808 of the reference coil component, or by performing a Hough transform on the 2D DFT of the second time window 814 of the reference coil component depicted in FIG. 8. The transformer component 215 can generate the Hough accumulator space 910 by performing a Hough transform on the 2D DFT of the first time window 810 of the hydrophone component, or by performing a Hough transform on the 2D DFT of the second time window 816 of the hydrophone component depicted in FIG. 8. The transformer component 215 can generate the Hough accumulator space 912 by performing a Hough transform on the 2D DFT of the first time window 812 of the vertical particle motion sensor component, or by performing a Hough transform on the 2D DFT of the second time window 818 of the vertical particle motion sensor component depicted in FIG. 8.

As illustrated by the images depicted the Hough accumulator spaces 908, 910, and 912, the transformer component 215 can be configured with a boundary condition that can prevent vertical features from causing issues. Furthermore, the Hough accumulator spaces 908, 910 and 912 generated from seismic data lacking extraneous noise are different from the Hough accumulator spaces 708, 710 and 712 generated from seismic containing extraneous noise. Thus, Hough tensors generated by filtering Hough accumulators 708, 710 and 712 can be referred to as noisy Hough tensors or historical noisy Hough tensors. Hough tensors generated by filtering Hough accumulators 908, 910 and 912 can be referred to as noiseless Hough tensors or historical noiseless Hough tensors.

The data processing system 205 can include a noise detection component 225 designed, constructed and operational to identify or detect extraneous noise based on the Hough tensors or the seismic data transformed into the Hough accumulator space. The noise detection component 225 can be configured with one or more rules, policies, thresholds, heuristic techniques or other logic to detect noise based on the Hough tensors generated from the seismic data. For example, the noise detection component 225 can use an image processing technique to detect a presence of extraneous noise in the seismic data based on the Hough tensors. The noise detection component 225 can detect the extraneous noise based on a comparison of the Hough tensors with Hough tensors generated historical seismic data. The noise detection component 225 can detect, based on a comparison of an eigenvector and eigenvalue of a canonical matrix of the Hough tensors with a historical eigenvector and eigenvalue of a historical canonical matrix of historical Hough tensors of historical seismic data, a first presence of noise in the seismic data. The first presence of noise can correspond to a noisy spectra pattern in at least one of the seismic data transforms of the windows of the seismic data.

For example, the noise detection component 225 access historical data 255 stored in data repository 235. The historical data 255 can correspond to previously collected seismic data. The historical data 255 can include noisy Hough tensors that were generated using seismic data that contains extraneous noise (e.g., abnormal data). The historical data 255 can include noiseless Hough tensors generated using seismic data that does not contain extraneous noise (e.g., expected or desired data). To detect extraneous noise in real-time during a seismic survey, the noise detection component 225 can generate Hough tensors within a shot interval, and compare the generated Hough tensors with the historical noisy Hough tensors and the historical noiseless Hough tensors. The noise detection component 225 can determine whether the generated Hough tensors are more similar to the noisy historical Hough tensors or the noiseless historical Hough tensors. If the noise detection component 225 determines that the generated Hough tensors are more similar or more closely match the noisy historical Hough tensors, then the noise detection component 225 can determine that the seismic data from the shot interval contains extraneous or unexpected noise. If, however, the noise detection component 225 determines that the generated Hough tensors are more similar or more closely match the noiseless historical Hough tensors, then the noise detection component 225 can determine that the seismic data from the shot interval does not contain extraneous or unexpected noise. Rather, the noise may be coherent or expected noise. Thus, the present technical solution, using Hough transforms, can detect extraneous noise in a seismic survey in real-time within a shot interval.

To compare the Hough tensors with the historical noisy and noiseless Hough tensors, the noise detection component can use sub-matrix regions of the Hough tensor which are characterized by eigenvalues and eigenvectors of canonical forms of these matrices. The system can characterize, describe, define or identify the Hough tensor by determining the corresponding eigenvectors and eigenvalues of certain canonical forms of sub-matrix tensors for the data in the Hough space. A canonical matrix form can refer a standard form of the matrix, standardization of the matrix, or normalization with respect to an equivalence relation. Other examples of canonical matrix form can include a triangular form, Jordan canonical form, or row echelon form.

The noise detection component 225 can determine the same set of matrix attributes of the generated Hough tensors and compare these using a matrix similarity system metric facilitated by the canonical forms of the historical noisy Hough tensor and the historical noiseless Hough tensor. If the similarity metric for the current shot interval is below a threshold which corresponds to the population of noiseless historical data, then the noise detection component 225 can determine that the shot interval does not include extraneous noise. If, however, the similarity metric for the current shot interval is above a threshold which corresponds to the population of noiseless historical data, then the noise detection component 225 can determine that the shot interval does includes extraneous noise. The extraneous noise can manifest itself as a wide range of patterns within the 1-dimensional and 2-dimensional Fourier domain as well as other data domains and subsequently their Hough transform space, including the examples shown corresponding to unidirectional aliasing (e.g., 532 or 534 depicted in FIG. 5) in at least one of the 2-dimensional Fourier transforms (e.g., 514, 516, or 518) of the windows of the seismic data.

The noise detection component 225 can leverage a model 250 trained using a machine learning component 220 to detect noise. The machine learning component 220 can train the model using historical seismic data. The machine learning component 220 can generate a model based on the historical noisy Hough tensors and the historical noiseless Hough tensors. The machine learning component 220 can use any type of machine learning technique to train the model 250 to identify features in Hough tensors that correspond to extraneous noise or the absence of extraneous noise. For example, the machine learning component can 220 use a neural network or convolution neural network with input and output layers and one or more hidden layers. The machine learning component 220 can train the model using historical noisy and noiseless Hough tensors to generate weights of coefficients for the hidden layers in order to generate a model 250. Upon training the model 250, the noise detection component 225 can input, into the model, the Hough tensors generated from seismic data in real-time within a shot interval to output an indication or likelihood that the Hough tensors correspond to Hough tensors containing extraneous noise or Hough tensors lacking extraneous noise.

In another example, the machine learning component 220 can be configured with one or more pattern matching techniques. Pattern matching techniques can include, for example, supervised learning that is based on training data (e.g., the historical noisy data and historical noiseless data) that is labeled as noisy or noiseless. The machine learning component 220 can use a machine learning technique to generate a model 250. In some cases, the machine learning component 220 can use unsupervised learning to generate the model 250 based on historical data that is not labeled as noisy or noiseless in order to automatically identify patterns in the noisy and noiseless Hough tensors that can then be used to determine an output value for new instances of Hough tensors generated in real-time from seismic data. To identify patterns, the machine learning component 220 can use parametric methods such as linear or quadratic discriminant analysis or a maximum entropy classifier (e.g., logistic regression). To identify patterns, the machine learning component 220 can use a nonparametric methods, such as decision trees, kernel estimation, K-nearest-neighbor, Naïve Bayes classifier, neural networks (e.g., multi-layer perceptrons), or support vector machines. To identify patterns, the machine learning component 220 can use clustering methods such as hierarchical clustering, K-means clustering, or correlation clustering.

The noise detection component 225 can use a numerical tensor or matrix representation of the pattern within the 2D DFT for the seismic data to train a model 250 to recognize the differences between nominal data (e.g., noiseless seismic data) and data with extraneous noise in place. The noise detection component 225 can break down the Hough tensor into sub areas of smaller and smaller areas or sub-matrices. The noise detection component 225 can determine a covariance matrix of each of the areas and reduce each matrix to a canonical form comprising an eigenvector and a corresponding eigenvalue. This canonical form defined by the eigenvector and corresponding eigenvalue generated from breaking down the Hough tensors into small subareas can describe the pattern across the matrix (e.g., Hough tensor matrix 606). For example, the data processing system 205 can obtain or access the machine learning model 250 trained with historical seismic data comprising noiseless data and abnormal data, and input the one or more eigenvalues of the Hough tensors generated for new seismic data into the machine learning model 250 to detect the first presence of noise in the seismic data. The eigenvalues can include a first one or more eigenvalues mapping the Hough tensors to noiseless historical data, and a second one or more eigenvalues mapping the Hough tensors to abnormal historical data. The eigenvalues can map the Hough tensors to the historical noisy or noiseless data, or the eigenvalues can be compared with eigenvalues of the noisy and noiseless historical Hough tensors.

The noise detection component 225 can recognize patterns associated with nominal or noiseless data (or data containing extraneous data) using an inference neural network that uses a trained model 250. The noise detection component 225, in some implementations, can further weight the covariance matrixes for performance. For example, the data processing system 205 generate a 1D Fourier transform of the seismic data (e.g., as depicted in diagrams 502, 504 or 506 of FIG. 5). The data processing system 205 can detect a spike in the 1D Fourier transform of the seismic data. For example, the data processing system 205 can detect spike 536 or spike 538 in the 1D DFT of a second time window 526 or 530 of the hydrophone or vertical particle motion sensor component, respectively. The data processing system 205 can use a spike detection technique, such as by identifying a height of the spike relative to other data points, a 3 dB width of the spike, a slope of the spike, or other characteristic. Upon detecting the spike 536 or 538, the data processing system 205 can apply a weight to the one or more eigenvalues based on the spike to generate one or more weighted eigenvalues. The weighted eigenvalues can improve a likelihood of determining a similarity with noisy historical Hough tensors because the spike in the 1D DFT of the second time window 526 or 528 can indicate an increased likelihood of extraneous noise. The data processing system 205 can display, on a display device of computing device 260, the one or more eigenvalues and the one or more weighted eigenvalues.

The noise detection component 225 can use these covariance matrixes to automatically detect, in real-time, the presence of extraneous noise within a shot interval. Thus, when the data processing system 205 receives new seismic data, the data processing system 205 can convert the seismic data within 3-6 seconds to the same canonical defined by an eigenvector and eigenvalue generated from breaking down the Hough tensors, and then determine the similarity between this new eigenvector and eigenvalue relative to noisy and noiseless data. The degree of similarity can be referred to as a similarity metric. The noise detection component 225 can generate a similarity metric from multiple key covariance matrices to determine the overall similarity of the pattern of the new seismic data to detect the presence of the extraneous noise. Thus, the data processing system 205 of this technical solution can detect extraneous noise in real-time within about 5 seconds of receiving the seismic data from a shot interval.

The data processing system 205 can include a notification component 230 designed, constructed and operational to generate a notification based on the output of the noise detection component 225. The notification component 230 can provide, responsive to detection of the presence of extraneous noise in the seismic data, a notification. The notification can indicate that there was extraneous noise in the seismic data. The notification can include an identifier corresponding to the shot interval. The notification can include a timestamp corresponding to the shot interval or seismic data containing the extraneous noise. The notification can include an indication of the component (e.g., hydrophone, geophone, or reference coil) that collected the seismic data containing the extraneous noise. The notification can include an indication of which traces or channels contained the extraneous noise.

The notification component 230 can generate the notification to indicate to adjust a characteristic of the seismic survey in order to reduce or eliminate the extraneous noise. The notification can be to adjust the characteristic of the seismic survey such to cause subsequently detected seismic data to have a second presence of noise that is less than the first presence of noise. For example, the second presence of noise can refer to an absence of extraneous noise, or an amount of extraneous noise that is less than the amount of extraneous noise in the first presence of noise. The second presence of noise can correspond to an absence of uni-directional aliasing as depicted in the 2D DFT images 816 and 818 in FIG. 8, whereas the first presence of noise can correspond to the presence of uni-directional aliasing in the 2D DFT images 516 and 518 depicted in FIG. 5.

The characteristic of the seismic survey can include, for example, a characteristic of a seismic data acquisition unit or component thereof. The characteristic can refer to disabling a component in one or more seismic surveys. The characteristic can refer to adjusting the location of a component or other object that may have caused a side swipe or blow to a component or other object that resulted in the extraneous noise. The extraneous noise may be due to a pressure change, in which case the notification can indicate to delay the next shot or otherwise make an adjustment so as to mitigate the effect of the pressure change (e.g., adjust a depth of the seismic data acquisition units in the aqueous medium to offset the pressure change). The extraneous noise may be due to extraneous or excessive vibration caused by the marine vessel 5, a crane 25A, a motor on the vessel 5, or a second marine vessel in proximity to the sensors 30, in which case the notification to adjust the characteristic of the seismic survey can refer to eliminating or minimizing the source of the extraneous vibration. In some cases, the notification can indicate the presence of extraneous noise and display a diagram, such as a 2D DFT, that indicates the uni-directional aliasing to cause an operator of the seismic survey to identify the source of the extraneous noise in the seismic survey.

Thus, the data processing system 205 can detect the first presence of noise in real-time during operation of a seismic survey. The first presence of noise can refer to or include extraneous noise, which can correspond to unexpected or abnormal noise. The first presence of noise can refer to extraneous noise that is different from expected noise such as coherent noise. Unexpected extraneous noise can refer to an anomaly caused by a side swipe or other interference. The data processing system 205 using this technical solution can detect the first presence of noise or extraneous noise in real-time or within 5, 6 or 7 seconds of receiving the seismic data for a shot interval. The data processing system 205 can perform an extraneous noise detection process for one or more or all shot intervals in a seismic survey and provide the results in real-time or within 5 or 6 seconds of receiving the seismic data for that short interval. The shot interval can correspond to generation of a seismic signal (or seismic wave or acoustic wave or signal) by a seismic device or seismic source (e.g., an acoustic gun or other source). The data processing system 205 to detect the first presence of noise in the seismic data within 30 seconds of generation of the seismic wave by the source, or within 5 or 6 seconds of receiving the seismic data.

After the data processing system 205 provides the notification to adjust the characteristic of the seismic survey to reduce noise in subsequently detected seismic data, the data processing system 205 can receive new seismic data collected from a subsequent shot interval. For example, the first seismic data can correspond to seismic data having extraneous noise, such as the seismic data used to generate the 1D and 2D DFTs depicted in FIG. 5 and the Hough accumulators depicted in FIG. 7. With the new seismic data collected subsequent to the notification to adjust the seismic survey, the data processing system 205 can generate second Hough tensors for a second set of 2-dimensional Fourier transforms of a second set of windows of the second seismic data. The second Hough tensors can be generated from the Hough accumulator space for seismic data without extraneous noise depicted in FIG. 9. The data processing system 205 can detect, based on a comparison of one or more second eigenvalues of the second Hough tensors with the historical data, an absence of the noise in the second seismic data. The data processing system 205 can identify the absence of noise based on determining a similarity metric for the second Hough tensors that indicates a degree of similarity to noisy Hough tensors or noiseless Hough tensors. The absence of extraneous noise can refer to an absence of uni-directional aliasing 832 or 834 as depicted in FIG. 8. The data processing system 205 can provide, responsive to detection of the absence of the noise in the second seismic data, an indication that the adjustment of the characteristic of the seismic survey to reduce or eliminate extraneous noise relative to the first presence of extraneous noise was successful.

In implementations, the data processing system 205 can generate one or more images (e.g., as depicted in FIG. 8) using seismic data collected subsequent to the detection of the absence of the noise, and provide, for display on a display device, the one or more images (e.g., 816 or 818) indicating a presence of subsurface lithological formations or hydrocarbon formations.

Figure 3:
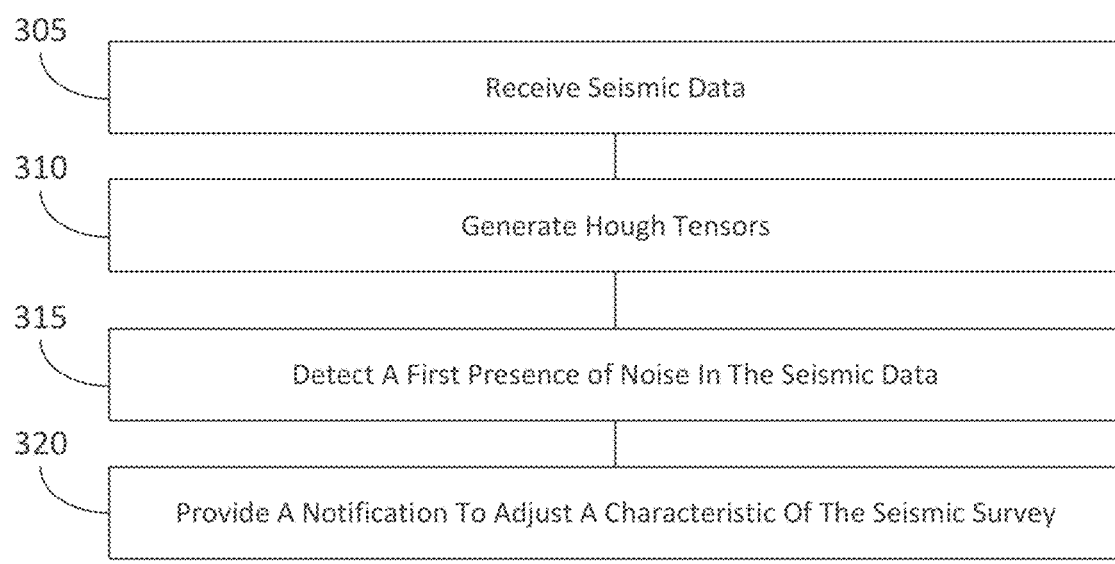
FIG. 3 depicts a flow diagram of a method of identifying in real-time extraneous noise in seismic surveys, in accordance with an implementation.

FIG. 3 depicts a flow diagram of an example method for identifying in real-time extraneous noise in a seismic survey. The method 300 can be performed by one or more component or system depicted in FIG. 1 or 2, including, for example, a data processing system, transformer component, or noise detection component. The method 300 can include the data processing system receiving seismic data at ACT 305. The data processing system can receive seismic data during a shot interval or subsequent to completion of a shot interval. The data processing system can receive the seismic data in real-time, such as once the seismic data is recorded. The data processing system can receive a seismic data feed in real-time during the shot interval, such as prior to completion of a 10 second shot interval, for example. The data processing system can receive a real-time data feed or data stream of the seismic data recorded by components of seismic data acquisition units deployed and activated for the seismic survey. The seismic data acquisition units can push the seismic data to the data processing system. The data processing system can request seismic data from the seismic data acquisition based on a time interval that corresponds to a shot interval. For example, the data processing system can transmit a request for seismic data to the seismic data acquisition unit. Thus, the data processing system can receive seismic data responsive to activation of a seismic source and collection of seismic data by a seismic sensor.

At ACT 310, the method 300 can include the data processing system generating Hough tensors. The data processing system can generate Hough tensors in real-time. Generating Hough tensors in real-time can refer to the data processing system generating the Hough tensors within 5 or 6 seconds of receiving the seismic data, which the data processing system can receive once the seismic data has been collected by a seismic data acquisition unit. The data processing system can generate the Hough tensors within 5 to 10 seconds of completion of the shot interval. To generate the Hough tensors, the data processing system can generate a seismic data transform in multiple dimensions (e.g., a 2D DFT of one or more windows of the seismic data). Types of seismic data transforms can include a Fourier transform, tau p transform, radon transform, or curvelet transform, for example. The data processing system can transform the seismic data transform to a Hough accumulator space. The data processing system can then filter the Hough accumulator to generate a matrix comprising Hough tensors. In some cases, the data processing system can apply a low pass 3 Hz filter to the seismic data prior to generating the seismic data transform.

At ACT 315, the method 300 can include the data processing system detecting a first presence of noise in the seismic data. The first presence of noise can refer to extraneous noise or abnormal noise. The data processing system can detect the extraneous noise by comparing an eigenvector and eigenvalue of a canonical matrix of the Hough tensors with a historical eigenvector and eigenvalue of a historical canonical matrix of historical Hough tensors of historical seismic data. The presence of noise can correspond to a noisy spectra pattern in at least one of the seismic data transforms of the windows of the seismic data. For example, the noisy spectra pattern can correspond to uni-directional aliasing in a 2-dimensional DFT.

The data processing system can detect the extraneous noise by comparing the Hough tensor with historical noisy and noiseless Hough tensors to determine a similarity metric. If the Hough tensor is more similar to the noisy historical Hough tensor (e.g., based on a comparison of eigenvalues or a mapping of eigenvalues), the data processing system can determine that the shot interval contains extraneous noise. In some cases, the data processing system can use a model trained using machine learning to identify similarities between the Hough tensor and the noisy historical Hough tensor. Thus, the data processing system can detect, based on a comparison of one or more eigenvalues of the Hough tensors with historical data, the first presence of noise in the seismic data (e.g., the presence of extraneous noise corresponding to uni-directional aliasing in a 2D DFT of the seismic data).

At ACT 320, the method 300 can include the data processing system providing a notification to adjust a characteristic of the seismic survey. The notification can indicate a detection of the extraneous noise. An operator of the seismic survey, upon receiving the notification, can debug the seismic survey to identify the source of the extraneous noise. In some cases, the data processing system can pause data collection or generation of seismic signals until the source of the extraneous noise has passed. For example, if the cause of the extraneous noise was a side swipe to a component of the seismic survey, then delaying data collection or activation of seismic surveys for one or more shot intervals may allow for the extraneous noise source to pass, thereby preventing the collection of poor quality data. Thus, the notification can be to delay or pause performance of the seismic survey. In some cases, the data processing system can flag the shot interval as being a noisy shot interval such that the shot interval may not be used in subsequent downstream seismic processing or imaging. In some cases, the data processing system can automatically take one or more actions responsive to detecting extraneous noise. For example, the data processing system can automatically provide an instruction to one or more component of the seismic survey environment 101 depicted in FIG. 1 that mitigates negative impacts of extraneous noise or mitigates the source of the extraneous noise. For example, the data processing system can transmit an instruction or command, responsive to detecting extraneous noise, to pause further data collection for one or more shot intervals.

In some cases, the data processing system can automatically pause the seismic survey or data collection responsive to detecting extraneous noise. The data processing system can automatically pause the seismic survey until an operator reactivates the seismic survey. In some cases, the data processing system can automatically purge or delete collected seismic data from a shot interval that is determined to contain extraneous noise. By automatically deleting such data, the data processing system can reduce data storage.

Figure 10:
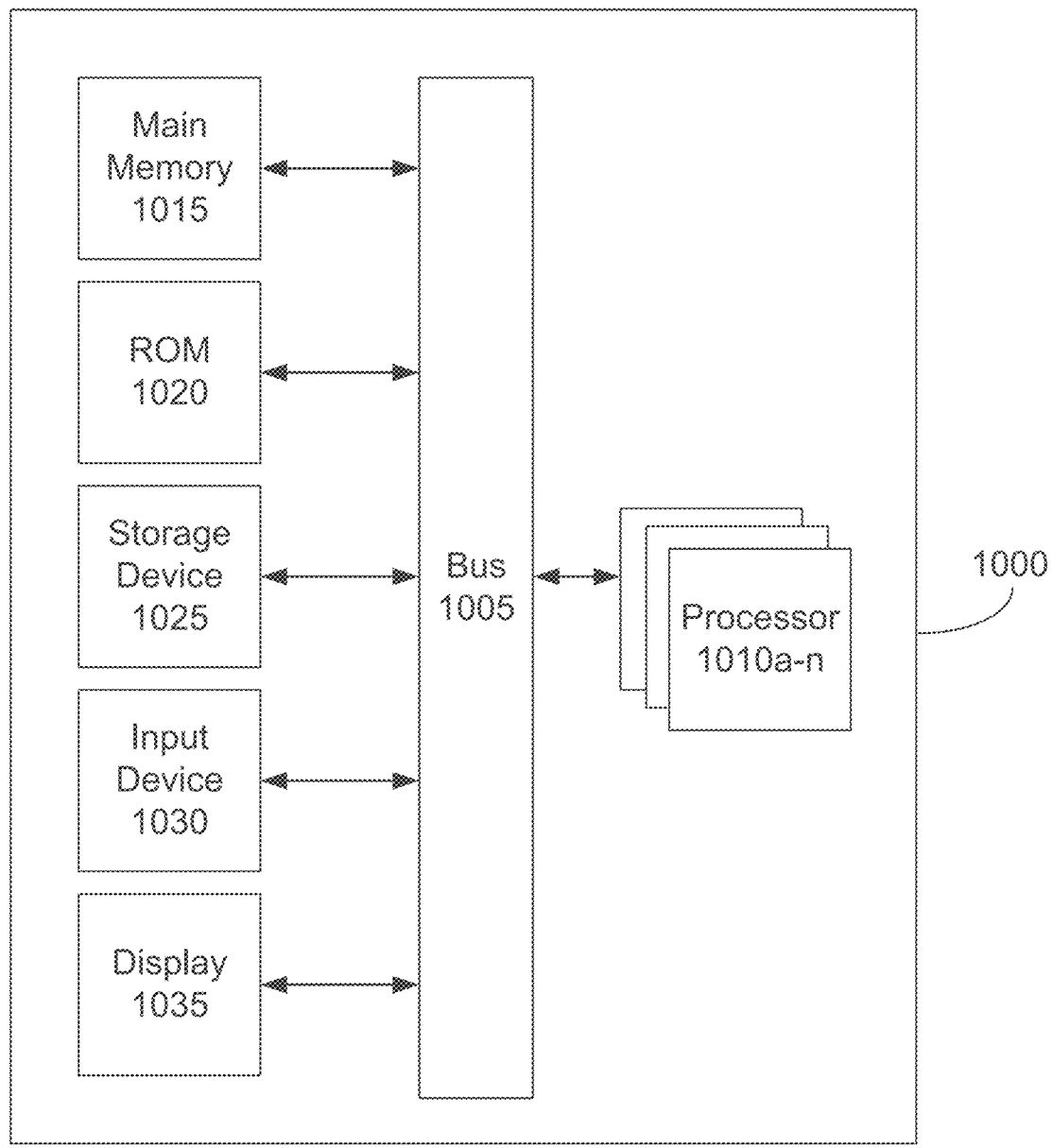
FIG. 10 depicts a block diagram of an architecture for a computing system employed to implement various elements of the system depicted in FIG. 1 or the method depicted in FIG. 2.

FIG. 10 depicts a block diagram of an architecture for a computing system employed to implement various elements of the systems or components depicted in FIG. 1 or FIG. 2. FIG. 10 is a block diagram of a data processing system including a computer system 1000 in accordance with an embodiment. The data processing system, computer system or computing device 1000 can be used to implement one or more component configured to filter, translate, transform, generate, analyze, or otherwise process the data or signals depicted in FIGS. 1-9. The computing system 1000 includes a bus 1005 or other communication component for communicating information and a processor 1010 or processing circuit coupled to the bus 405 for processing information. The computing system 1000 can also include one or more processors 1010 or processing circuits coupled to the bus for processing information. The computing system 1000 also includes main memory 1015, such as a random access memory (RAM) or other dynamic storage device, coupled to the bus 1005 for storing information, and instructions to be executed by the processor 1010. Main memory 1015 can also be used for storing seismic data, binning function data, images, reports, tuning parameters, executable code, temporary variables, or other intermediate information during execution of instructions by the processor 1010. The computing system 1000 may further include a read only memory (ROM) 1020 or other static storage device coupled to the bus 1005 for storing static information and instructions for the processor 1010. A storage device 1025, such as a solid state device, magnetic disk or optical disk, is coupled to the bus 1005 for persistently storing information and instructions.

The computing system 1000 may be coupled via the bus 1005 to a display 1035 or display device, such as a liquid crystal display, or active matrix display, for displaying information to a user. An input device 1030, such as a keyboard including alphanumeric and other keys, may be coupled to the bus 1005 for communicating information and command selections to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. In some embodiments, hard-wired circuitry may be used in place of or in combination with software instructions to effect illustrative implementations. Thus, embodiments are not limited to any specific combination of hardware circuitry and software.

Although an example computing system has been described in FIG. 10, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to detect and control noise in seismic surveys, comprising:
    a data processing system comprising memory and one or more processors is configured to:
    receive, responsive to a seismic wave generated by a source, a first seismic data detected by a sensor component of a seismic data acquisition unit;
    generate, for a first plurality of windows of the first seismic data, a first Hough tensors, wherein the first Hough tensors are generated, for a first plurality of seismic data transforms, in a plurality of dimensions;
    detect, based on a comparison of an eigenvector and eigenvalue of a canonical matrix of the first Hough tensors with a historical eigenvector and eigenvalue of a historical canonical matrix of historical Hough tensors of historical seismic data, a first presence of noise in the seismic data corresponding to a noisy spectra pattern in the first plurality of seismic data transforms of the first plurality of windows of the seismic data;
    obtain a machine learning model trained with historical seismic data comprising noiseless data and abnormal data;
    input one or more eigenvalues of the first Hough tensors for new seismic data into the machine learning model to detect the first presence of noise in the seismic data; and
    provide, responsive to detection of the first presence of noise in the seismic data, a notification to adjust a characteristic of the seismic survey to cause the new seismic data subsequent to the first seismic data to have a second presence of noise that is less than the first presence of noise, wherein the notification is generated to delay or pause performance of the seismic survey, thereby improving the quality of subsequently collected seismic data and providing higher quality images.

2. The system of claim 1,
    wherein the data processing system is further configured to detect the first presence of noise in a shot interval corresponding to generation of the seismic wave by the source.

3. The system of claim 1, wherein the data processing system is further configured to detect the first presence of noise in the seismic data within 30 seconds of generation of the seismic wave by the source.

4. The system of claim 1, further comprising:
    a seismic streamer located in an aqueous medium, wherein the seismic streamer comprises a plurality of seismic data acquisition units.

5. The system of claim 1, wherein the sensor component comprises a hydrophone or a geophone.

6. The system of claim 1, wherein the first plurality of seismic data transforms in the plurality of dimensions correspond to a 2-dimensional Fourier transform.

7. The system of claim 1, wherein the first plurality of seismic data transforms in the plurality of dimensions correspond to a Tau-P transform.

8. The system of claim 1, wherein the data processing system is further configured to:
receive, subsequent to provision of the notification to adjust the characteristic of the seismic survey to reduce noise in the subsequently detected seismic data, a second seismic data detected by the sensor component of the seismic data acquisition unit;
generate a second Hough tensors for a second plurality of seismic data transforms of a second plurality of windows of the second seismic data;
detect, based on a comparison of eigenvalue-eigenvector representation of the second Hough tensors with the historical data, an absence of the noise in the second seismic data; and
provide, responsive to detection of the absence of the noise in the second seismic data, an indication that an adjustment of the characteristic of the seismic survey to reduce noise was successful.

9. The system of claim 8, wherein the data processing system is further configured to:
generate one or more images using seismic data collected subsequent to the detection of the absence of the noise in the second seismic data; and
provide, for display on a display device, the one or more images indicating a presence of subsurface lithological formations or hydrocarbon formations.

10. The system of claim 1, wherein the data processing system is further configured to: detect, in real-time, the first presence of noise in the seismic data detected by the sensor component.

11. The system of claim 1, wherein the data processing system is further configured to: apply a filter to remove predetermined frequencies from the seismic data; and generate the first Hough tensors for a plurality of 2-dimensional Fourier transforms of the first plurality of windows of the seismic data without the predetermined frequencies.

12. The system of claim 1,
wherein the data processing system is further configured to generate the first Hough tensors via a machine learning line detection technique.

13. The system of claim 1, wherein the data processing system is further configured to:
generate a 1-dimensional Fourier transform of the seismic data; detect a spike in the 1-dimensional Fourier transform of the seismic data;
apply a weight to the one or more eigenvalues based on the spike to generate one or more weighted eigenvalues; and
display, on a display device, the one or more eigenvalues and the one or more weighted eigenvalues.

14. The system of claim 1, wherein one or more eigenvalues of the canonical matrix comprise a first eigenvalues mapping the first Hough tensors to noiseless historical data and a second eigenvalues mapping the first Hough tensors to abnormal historical data.

15. A method of detecting and controlling noise in seismic surveys, comprising:
receiving, by a data processing system comprising memory and one or more processors, responsive to a seismic wave generated by a source, seismic data detected by a sensor component of a seismic data acquisition unit;
generating, by the data processing system, for a first plurality of windows of the seismic data, Hough tensors, wherein the Hough tensors are generated, for a first plurality of seismic data transforms in a plurality of dimensions;
detecting, based on a comparison of an eigenvector and eigenvalue of a canonical matrix of the Hough tensors with a historical eigenvector and eigenvalue of a historical canonical matrix of historical Hough tensors of historical seismic data, a first presence of noise in the seismic data, wherein one or more eigenvalues of the canonical matrix comprise at least a first eigenvalues mapping the Hough tensors to noiseless historical data, and at least a second eigenvalues mapping the Hough tensors to abnormal historical data;
obtain a machine learning model trained with historical seismic data comprising noiseless data and abnormal data;
input one or more eigenvalues of the Hough tensors for new seismic data into the machine learning model to detect the first presence of noise in the seismic data; and
providing, by the data processing system, responsive to detection of the first presence of noise in the seismic data, a notification to adjust a characteristic of the seismic survey to cause the new seismic data subsequent to the seismic data to have a second presence of noise that is less than the first presence of noise, wherein the notification is generated to delay or pause performance of the seismic survey, thereby improving the quality of subsequently collected seismic data and providing higher quality images.

16. The method of claim 15, further comprising:
detecting, by the data processing system, the first presence of noise in real-time during operation of a seismic survey and within 6 seconds of receiving the first seismic data for the shot interval.

17. The method of claim 15, wherein the sensor component comprises a pressure sensor or a particle motion sensor.

* * * * *